United States Patent [19]

Hamada et al.

[11] 4,109,808
[45] Aug. 29, 1978

[54] METHOD OF STORING ARTICLES IN A WAREHOUSE TO FORM AN IMAGINARY LINK OF ARTICLES

[75] Inventors: Nobuhiro Hamada; Kotaro Hirasawa, both of Hitachi; Minoru Hatada, Kokubunji; Hiroshi Tamura, Hitachi, all of Japan

[73] Assignee: Hitachi, Ltd., Japan

[21] Appl. No.: 693,980

[22] Filed: Jun. 8, 1976

Related U.S. Application Data

[63] Continuation-in-part of Ser. No. 461,431, Apr. 16, 1974, abandoned.

[30] Foreign Application Priority Data

Apr. 18, 1973 [JP] Japan .................................. 48-43127

[51] Int. Cl.² ............................................... B65G 1/06
[52] U.S. Cl. .............................. 214/152; 214/16.4 A; 214/16.4 B
[58] Field of Search .................... 214/16.4 A, 16.4 B, 214/16.1 A, 152, 16 B; 444/1; 235/150

[56] References Cited

U.S. PATENT DOCUMENTS

| | | | |
|---|---|---|---|
| 3,049,247 | 8/1962 | Lemelson | 214/16.4 A |
| 3,402,835 | 9/1968 | Saul | 214/16.4 A |
| 3,490,616 | 1/1970 | Castaldi | 214/16.4 A |
| 3,547,282 | 12/1970 | Hartbouer et al. | 214/16.4 A |
| 3,719,287 | 3/1973 | Billingsley | 214/16.4 A |

FOREIGN PATENT DOCUMENTS 1,157,071   7/1969   United Kingdom ............... 214/16.4 A

OTHER PUBLICATIONS

Six Hundred Products ... System; Mechanical Handling, pp. 49-51; Nov. 1970.
Activity Zone Storage System; pp. 1726-1729, Mechanical Handling-Nov. 1968.
System of the Month; Modern Material Handling, pp. 66-72, Nov. 1968.
System of the Month; Modern Material Handling, pp. 64-69, Nov. 1972.
Material Handling Control; Control Engineering, pp. 81-89, Sep. 1968.
System of the Month; Modern Material Handling, Aug. 1969, pp. 34-42.

Primary Examiner—Drayton E. Hoffman
Assistant Examiner—R. B. Johnson
Attorney, Agent, or Firm—Craig & Antonelli

[57] ABSTRACT

A method of storing articles in a warehouse having a plurality of storage blocks arranged adjacent each other with each of the storage blocks having a plurality of spaced racks for storing articles and linearly extending aisles between the racks. The warehouse also includes article transfer apparatus arranged for movement in respective aisles to transfer articles relative to a given location within a respective storage block and a control arrangement for operating the article transfer apparatus in accordance with a predetermined mode to transfer aritcles relative to said storage blocks. The method of storing includes the steps of storing a plurality of different articles in the storage blocks with at least two different aritcles in each storage block, storing in a first storage block at least one and another different articles, storing in a second storage block at least one article common to the one different article in the first storage block and at least one additional different article, storing in a third and any succeeding storage block at least one article common to the at least one additional different article of the immediately preceding storage block and at least one further different article, and storing in the last storage block as the at least one further different article an article common to the another different article of the first storage block to form an imaginary loop of articles in the warehouse.

8 Claims, 25 Drawing Figures

FIG. 2
| AISLE I | A, H |
| AISLE II | B, C |
| AISLE III | D, E |
| AISLE IV | F, G |
| AISLE V | A, B |
| AISLE VI | C, D |
| AISLE VII | E, F |
| AISLE VIII | G, H |
FIG. 3
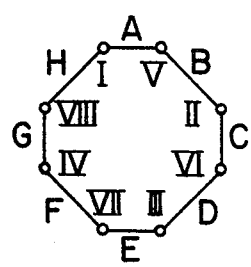
FIG. 4
| AISLE I | A, H |
| AISLE II | A, B |
| AISLE III | B, C |
| AISLE IV | C, D |
| AISLE V | D, E |
| AISLE VI | E, F |
| AISLE VII | F, G |
| AISLE VIII | G, H |
FIG. 5
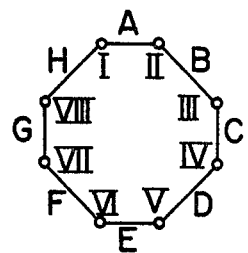

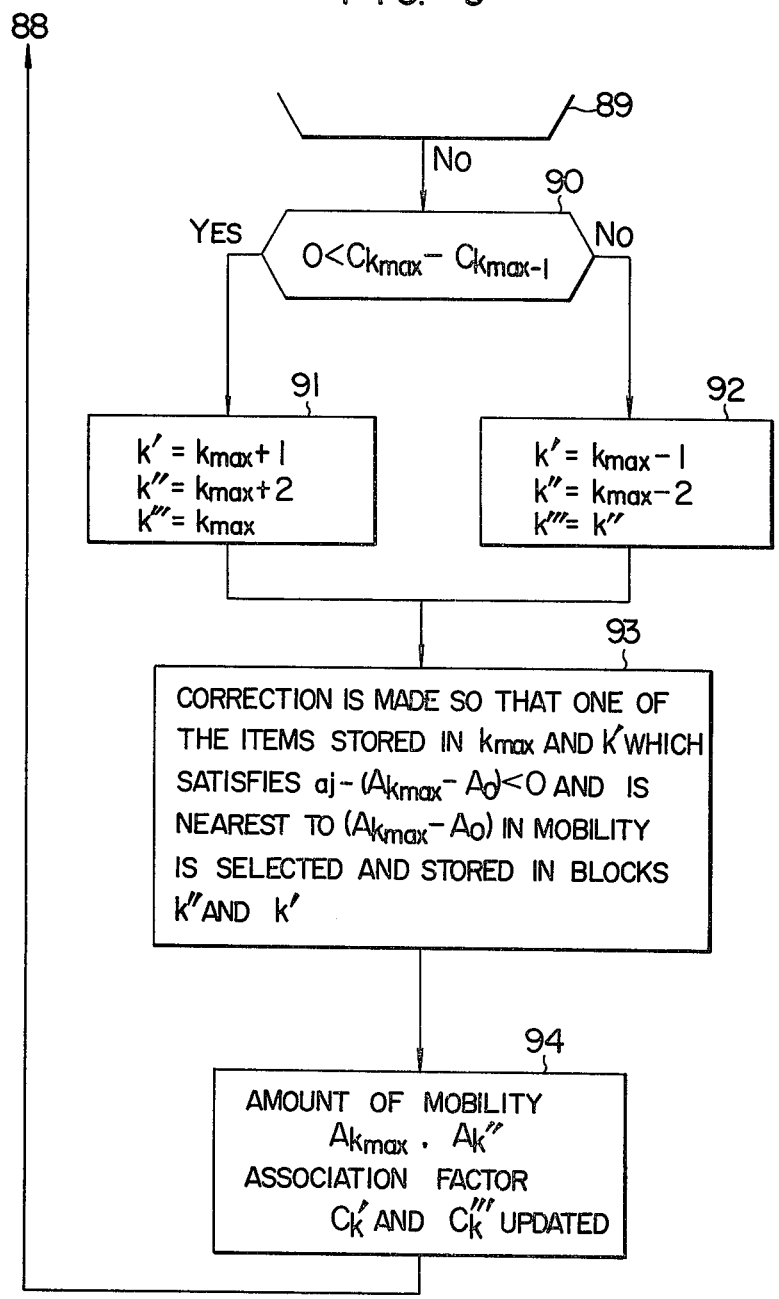

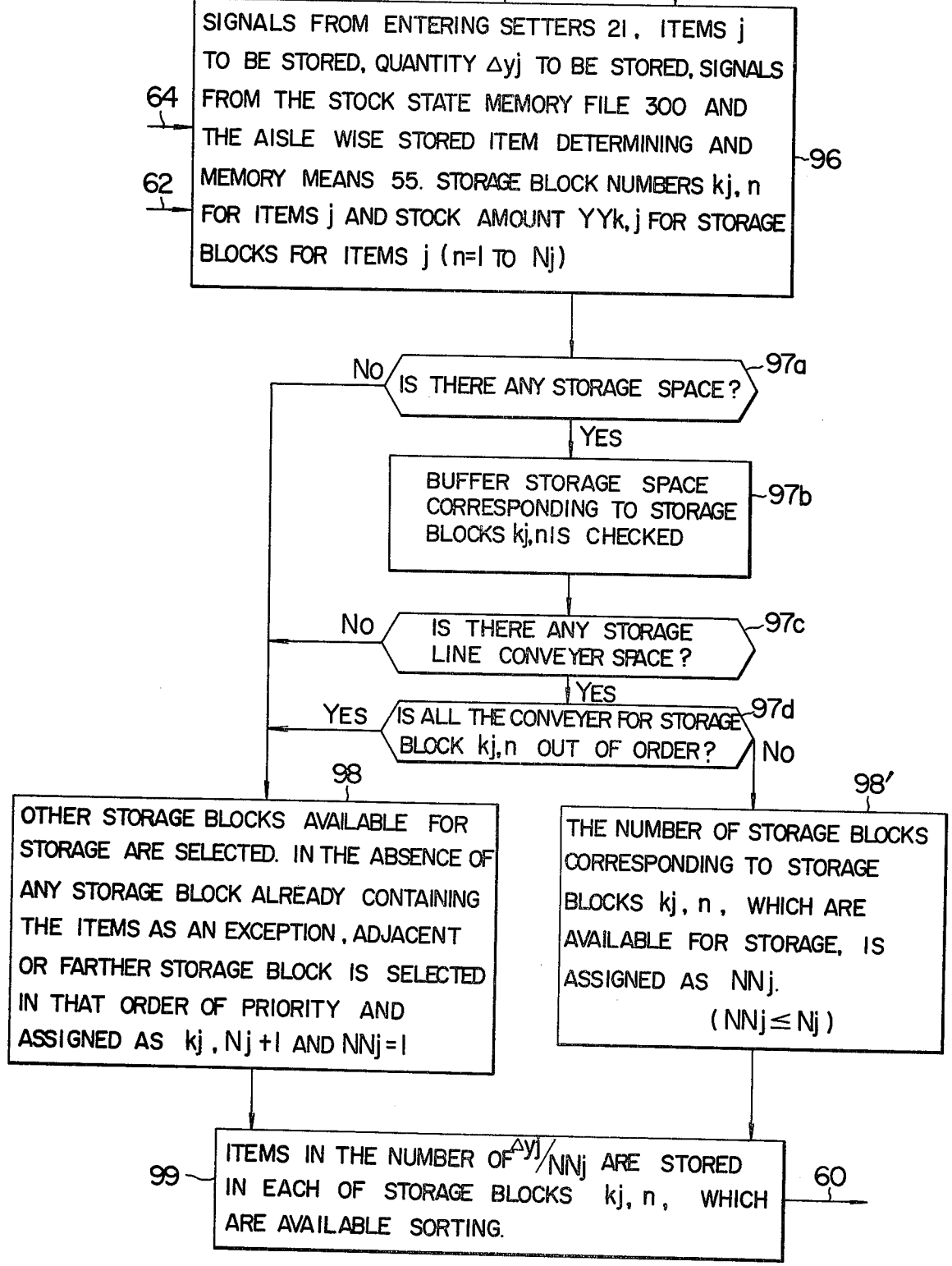

FIG. 11a

| I | $A^a, H^b$ | 2 | 2 | 0 |
|---|---|---|---|---|
| II | $A^c, B^d$ | 3 | ③ | 0 |
| III | $B^e, C^f$ | 2 | 2 | ① |
| IV | $C^g, D^h$ | 3 | 1 | 1 |
| V | $D^i, E^j$ | ⑤ | 0 | 0 |
| VI | $E^k, F^l$ | 3 | 0 | 0 |
| VII | $F^m, G^n$ | 0 | 0 | 0 |
| VIII | $G^p, H^q$ | 0 | 0 | 0 |

FIG. 11b

| II | $A^c, B^d$ | ③ | 0 | 0 |
|---|---|---|---|---|
| IV | $C^g, D^h$ | 3 | ③ | 0 |
| VI | $E^k, F^l$ | 3 | 3 | ③ |
| VIII | $G^p, H^q$ | 0 | 0 | 0 |

FIG. 11c

| I | $A^a, H^b$ | 2 | ② | 0 |
|---|---|---|---|---|
| III | $B^e, C^f$ | 2 | 2 | ② |
| V | $D^i, E^j$ | ⑤ | 0 | 0 |
| VII | $F^m, G^n$ | 0 | 0 | 0 |

METHOD OF STORING ARTICLES IN A WAREHOUSE TO FORM AN IMAGINARY LINK OF ARTICLES

CROSS-REFERENCES TO RELATED APPLICATION

This application is a continuation-in-part application of our copending application, Ser. No. 461,431 filed on Apr. 16, 1974, now abandoned.

BACKGROUND OF THE INVENTION

1. Field of the Invention

This invention relates to the controlling of an automated warehouse capable of automatically receiving and delivering articles or more in particular to the controlling of an automated warehouse whereby stored articles are allotted according to predetermined logics for efficient delivery and the delivery operation is balanced for each storage block of the warehouse thereby to perform efficient delivery by reducing inter-block concentration work amount for successful operation of the warehouse.

2. Description of the Prior Art

Flow of articles called the commodity distribution is, in brief terms, the processes through which raw materials are transformed by manufacture (or processing), shipped and delivered to general users. Of all these steps of distribution, considerable labor-saving means have been introduced into the manufacturing step, resulting in the tendency toward an increasingly reduced rate at which the cost of manufacturing step occupies a part of the entire production cost entailed through the commodity distribution. On the other hand, have a tendency to incur a large expense which is increasing more and more. Under these circumstances, it is important to improve the efficiency of the management and operation of distribution centers and warehouses which are nodes of the commodity distribution and which function to perform the switching between different types of transportation.

This invention provides an automated warehouse which functions as such a distribution node and a method of operation and management thereof.

Generally, a warehouse comprises a plurality of storage blocks each including a plurality of storage racks, and a plurality of stacker cranes for the purpose of performing delivery services in compliance with customer requisitions or requisitions for packing. In spite of the fact that the efficiency of delivery depends on the manner in which articles are stored, the method of the conventional storage lacks any logics but is based merely on the past experience. As a result, interblock work is not balanced in amount but in some cases delivery services to customers are concentrated on specific blocks. This is detrimental to the highly efficient use of the automated warehouse and also leads to the disadvantage of much time required for delivery services. For this reason, it has been earnestly desired, as a problem to be solved, to realize an optimum method of storage and that of delivery in line therewith which are capable of displaying the full ability of the warehouse as measured in terms of delivery volume per unit time no matter how many items of articles to be delivered are involved.

Another problem to be tackled is one of how to balance inter-block work for delivery services. To overcome this problem, a method of storage has been conceived in which storage spaces are allotted to a plurality of items of articles in such a manner as to allow them to be delivered from any storage blocks in compliance with delivery requisitions for a plurality of items. In an extreme case according to such a method, all the items involved are allotted to each of the storage blocks.

In the case where a customer requisitions the delivery of a multiplicity of articles of the same item, however, the disadvantage results that, for lack of a sufficient number of articles of the particular item in each aisle, an increased amount of concentration work is required. If the storage aisles are restricted for respective particular items, on the other hand, an increased amount of concentration work results for delivery in response to an order placed by a customer for articles of a plurality of items.

In view of the fact that the balance of inter-block work for delivery is inherently incompatible with the need for the decreased concentration work to meet each customer's requirement, it is necessary to maintain an equilibrium between them in operation and management of the automated warehouse.

In the conventional warehouse in which spaces for storing articles are allotted illogically on the sole basis of experience, the decision on delivery schedule to meet delivery requisitions for a plurality of items which may be issued at the same time by a plurality of customers requires much time on the one hand and a data processing system of a large memory capacity on the other.

The present invention is intended to obviate the above-mentioned disadvantages of the prior art and provides an automated warehouse and a control method for such an automated warehouse for performing efficient delivery services.

SUMMARY OF THE INVENTION

Accordingly, it is an object of the present invention to provide a method for storing articles in accordance with predetermined logics of storage space allotment to perform efficient delivery services.

Another object of the invention is to provide a method for achieving a balance between the amounts of delivery services for each storage block.

Still another object of the invention is to provide a method for reducing the amount of concentration work for each of a plurality of customers.

A further object of the invention is to provide a method for performing delivery services with an equilibrium maintained between the aforementioned two incompatible factors, that is, between the balance of delivery work for each storage block and the amount of concentration work.

According to one aspect of the invention, the first object of the invention is achieved by a novel link association system by which articles are stored in accordance with predetermined storage logics. The novel link association system is such that the association between aisles are improved by storing the same item of articles in a plurality of storage blocks according to the later-described logics taking into consideration the inter-aisle association.

Further, in order to achieve the second object of the invention, a method is provided for computing the amount of work in every storage block.

A third feature of the invention is that a method is provided for computing the amount of work of concentrating a plurality of items of articles for each of a plurality of customers who have issued delivery requisitions.

A fourth feature of the invention lies in that, in order to achieve the aforementioned fourth object, the delivery schedule is prepared by the use of a method whereby a group of storage blocks is selected for each customer in such a manner as to balance the inter-block delivery work on the one hand and to minimize the concentration work for each customer on the other.

Moreover, a fifth feature of the invention lies in that, in order to achieve the second, third and fourth objects, a delivery schedule described with reference to the fourth feature is prepared in such a manner as to assign the storage blocks in the order of decreasing number of common items between ones stored in the block and the ones requested by the customer.

BRIEF DESCRIPTION OF THE DRAWINGS

FIG. 1b is a front view of the automated warehouse of FIG. 1a.

FIG. 2 shows an example in which articles of items A to H are stored in eight storage blocks.

FIG. 3 is a diagram showing a storage pattern illustrating the association between different storage blocks of the example of FIG. 2.

FIG. 4 is a diagram showing another example in which articles are stored in a way different from the example of FIG. 2.

FIG. 5 is a diagram showing a storage pattern illustrating the association between different blocks of the example of FIG. 4.

FIGS. 8 and 9 are charts for explaining the flow of logics continued from FIG. 7.

FIG. 10 is a flow chart for explaining the logics of a means for determining entering aisles in FIG. 6 where articles are to be stored.

FIG. 11a is a diagram which shows a storage state in which eight items of articles are stored in eight storage blocks and all of the storage blocks are illustrated.

FIG. 11b is a diagram which shows a storage state in which eight items of articles are stored in eight storage blocks and in the case where even-numbered storage blocks are occupied.

FIG. 11c is a diagram which shows a storage state in which eight items of articles are stored in eight storage blocks and in the case where odd-numbered blocks are occupied.

DESCRIPTION OF THE PREFERRED EMBODIMENTS

Figure 1A:
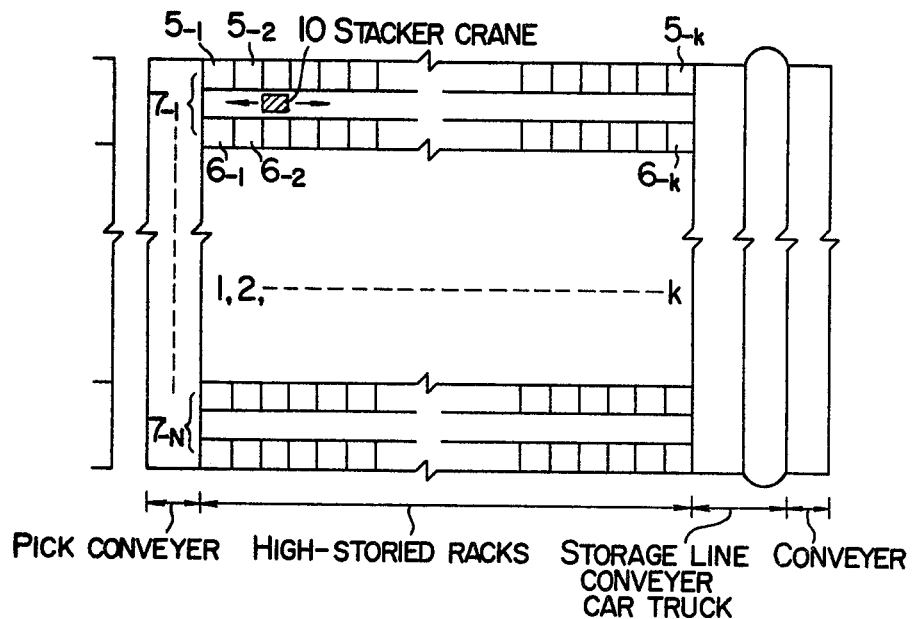
FIG. 1a is a schematic diagram of the automated warehouse, showing a plan view thereof.

First of all, symbols used in the disclosure, in the appended claims and in the figures of the drawings will be defined hereunder for facilitate the understanding of invention.

SYMBOLS USED IN CLAIMS

K: The number of storage blocks in an automated warehouse system.

R: A positive integer which is smaller than K, and sometime a measure of K.

k: Any positive integer which is not greater than K.

M: The number of items of articles stored in the automated warehouse.

M(k): The number of items of articles which are stored in the k-th storage block in the automated warehouse.

L: The number of storage block groups. Here, articles of all the M items are avairable from each of the L storage block groups.

SYMBOLS USED IN THE DISCLOSURE AND DRAWINGS

A, B, . . ., H (FIGS. 2, 3, 4, 5): The names of items of articles stored in an automated warehouse.

I, II, . . ., VIII (FIGS. 2, 3, 4, 5): The sequence numbers of storage blocks.

JM (=M): The number of items of articles stored in the automated warehouse.

j: The sequence number of an item of the articles stored in the automated warehouse.

$a_j$: An average mobility of the j-th items of articles which are delivered out in a day. Namely, the average mobility of the j-th item.

JM': The number of items of articles including both the ones which are stored in the warehouse, and the ones which will be newly stored in the near future.

j': The sequence number of an item of the articles which will be newly stored in the automated warehouse in the near future.

$k_{j,n}$: The sequence number of the storage block in which the j-th item of articles are required to be stored. Here n is a positive integer and is not larger than $N_j$.

$N_j$: The number of the storage blocks in which the j-th item of articles are required to be stored.

k: The sequence number of a storage block.

$K_{all}$ (=K): The number of storage blocks in the automated warehouse system.

$A_k$: The amount of the storaged items mobility in the k-th storage block.

$A_o$: The standard value of the $A_k$, which is obtained when the strage allottment is done in ideally balanced state, and which includes both the present items j and the newly stored items j'.

$C_k$: The inter-block association factor between a k-th storage block and a k + 1th storage block.

$C_o$: The standard association factor for $C_k$, which is obtained when the storage allotment is done in ideally balanced state.

JSORT(l): The l-th item's sequence number j', in order of the decreasing amount of average mobility aj' among the newly stored items j's.

l: A positive integer.

$k_{min}$ (FIGS. 7–10): The sequence number of the storage block where the association factor $Ck$ is minimum.

$k_{max}$ (FIGS. 7–10): The sequence number of the storage block where the amount of the stored items' mobility $Ak$ is maximum.

$yj$: The number of the stored articles of the $j$-th item, i.e. the stock amount of articles of the $j$-th item.

$A^2$: A customer has placed an order for two pieces of articles of item A. Or a storage block contains two pieces of articles of item A.

$i$: The sequence number of a customer who places orders to the automated warehouse.

ISORT($l$): The $l$-th customer's sequence number $i$, in order of decreasing amount of the sum of the work balance affecting factor $X_{k,i,p}$.

$I_{all}$: The number of customer to be allotted this time.

$M_i$: The number of items ordered by the $i$-th customer.

$J_{i,m}$: The sequence number of the $m$-th item of articles ordered by the $i$-th customer.

$N_{i,m}$: The number of articles of the $m$-th item ordered by the $i$-th customer.

$X_{k,i,p}$: The work balance affecting factor, that is the number of the delivered articles from the $k$-th storage block for the $i$-th customer, if the $p$-th storage block group is allotted.

$C_{i,p}$: The concentration work amount affecting factor, that is the number of storage blocks from which the $i$-th customer is served, if the $p$-th storage block group is allotted.

$p$: The sequence number of the storage block group.

$X_k^\Sigma$: The delivery work amount allotted to the $k$-th storage block, and initially the residual work amount which is due to the delayed schedule.

$Y_{k,j}$: The scheduled stock amount of articles of the $j$-th item in the $k$-th storage block.

$X^0$: The target value of the work amount to be allotted to each storage block.

$p_{min}$: The sequence number of the storage block group which has minimum $C_{i,p}$ for the $i$-th customer.

$k_{max}$ (FIGS. 14, 15): The sequence number of the storage block which has maximum $X_{k,i,p_{min}}$ for the corresponding $i$-th customer and $p_{min}$-th storage block group.

$k_{min}$ (FIGS. 14, 15): The sequence number of the storage block which has minumum $X_k^\Sigma$.

$p_{max}$: The sequence number of the storage block group which has maximum $X_{k_{min},i,p}$ for the corresponding $k_{min}$-th storage block and the $i$-th customer.

$p_i$: The sequence number of the storage block group which is allotted for the $i$-th customer.

$k(p)$ (FIG. 15, Block 320): The sequence number of storage block which belongs to block group $p$, and is expected to serve the corresponding item $J_{i,m}$.

Prior to explanation of preferred embodiments of the invention, description will be made first of certain facts constituting the basis of the present invention for facilitating the understanding thereof.

An up-to-date automated warehouse comprises a multiplicity of racks arranged vertically one on another for the purpose of achieving an improved capacity for a unit land area, so that stacker cranes move both vertically and horizontally between rows of the racks thereby to pick up pallets for delivery.

The vertically arranged racks covered by one stacker crane placed between the rows thereof for delivery services are generally referred to as a storage block (which may be alternatively called an aisle). An automated warehouse usually comprises a plurality of storage blocks to serve a plurality of customers. In common practice, a delivery schedule is prepared for the day in accordance with delivery requisitions received during the preceding day or before, whereas articles are entered and stored in racks from storage lines in the night.

Figure 1B:
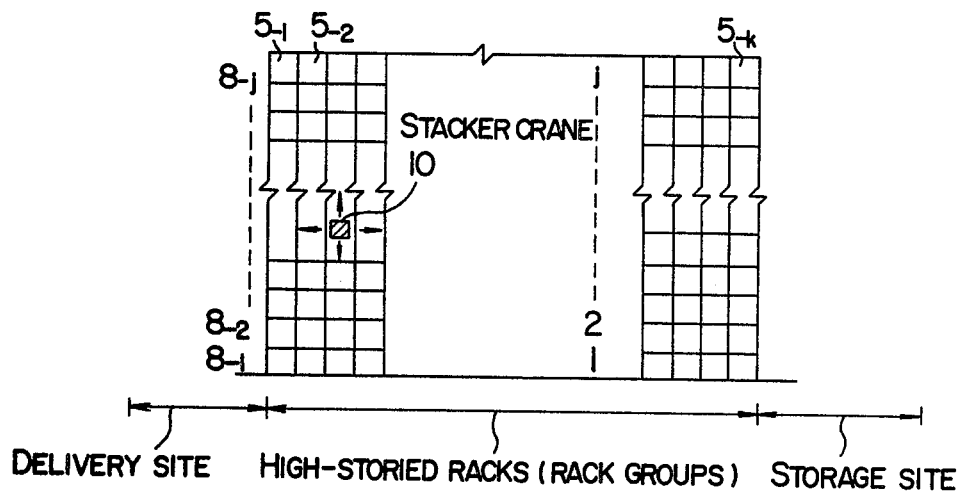

One of most common automated warehouses is shown in FIGS. 1a and 1b. A plan view of such a warehouse is shown in FIG. 1a in which it will be seen that there are N storage blocks including 7-1, 7-2, ... 7-N, of which the storage block 7-1 comprises a couple of rows of storage racks 5-1 to 5-$k$ and 6-1 to 6-$k$ and there is arranged a stacker crane 10 between the two rows. The number of storage blocks $K_{all}$ is N in this case. The stacker crane 10 which is provided for delivering from and entering in the storage block 7-1 is movable vertically and horizontally. A front view of the storage block 7-1 on the side of the high-storied racks 5-1 to 5-$k$ is schematically shown in FIG. 1b.

Racks in the number of $j$ are vertically arranged as shown by numerals 8-1 to 8-$j$ and the stacker crane 10 moves up and down or right and left as desired in a vertical plane to pick up pallets in accordance with a predetermined delivery schedule. In this particular example, each storage block comprises (2 × $j$ × $k$) storage racks, so that the warehouse as a hole include N(2 × $j$ × $k$) storage racks.

The factors to be taken into consideration in allotment of items of the articles to be stored in this automated warehouse are (1) that the delivered-out state of any storage blocks is prevented as far as possible, (2) that the impact which the inoperativeness of any storage block for some reason or other may have on the other storage blocks is capable of being dampened, (3) that the work of concentrating articles to be delivered to the same customer is prevented from extending across from one storage block to the other, (4) that a balance of amount of delivery work between storage blocks is maintained, (5) that the balance of stock amount is maintained between storage blocks, (6) that the balance of load is maintained between storage line conveyers at the time of storage, and (7) that the balance of operation of stacker cranes is maintained at the time of entering operation.

The extension of concentrating work to other storage blocks or aisles referred to in (3) above will be explained a little more in detail.

The problem often posed by the warehouse where articles of all items are not stored in a single storage aisle is that delivery from a plurality of aisles is required if a requisition for a plurality of items is to be met. This coverage of a plurality of aisles to meet the requisitions by a single customer is called an "inter-aisle jump". Even in the case where each aisle contains articles of all the items, the requirement of an "inter-aisle jump" occurs if there is a delivered-out state of any aisle.

The present invention will be explained with reference to an actual example thereof. First, description will be made of a method of storing articles of a multiplicity of items by the novel link system.

As a simple example, assume that a small warehouse has eight storage blocks or aisles and articles of eight items A to H are stored therein. In actual practice, eight aisles are often capable of storing articles of several hundreds to several thousands of items, and the warehouse is usually so constructed that no traffic between aisles is allowed except through the entering or delivery port. The aisles I to VIII are divided into two aisle groups, one including the aisles I to IV and the other the aisles V to VIII to each of which groups articles of all the items A to H are allotted in such an order as shown in FIG. 2. A storage pattern showing the relation between items and aisles storing them is illustrated in FIG. 3. In the same figure, the symbols "o" show aisles. As an example, articles of items A and H are stored in the aisle I. It may be alternatively said that articles of the item A is stored in both the aisles I and V. This way of storage has the advantage that the amount of concentration work can be rendered uniform regardless of any inter-aisle jump which may occur.

Another example of the storage by the link system and its storage pattern are shown in FIG. 4 and FIG. 5 respectively.

In this case, like the embodiments of FIGS. 2 and 3, the distance of an inter-aisle jump, if any, can be minimized. FIG. 4 shows a case in which articles of all the items A to H are stored in each of two groups of aisles one of which groups includes the aisles I, III, V and VII and the other includes the aisles II, IV, VI and VIII.

It will be also apparent from FIGS. 3 and 5 that the aisles are associated with each other in the form of a link by means of the items of the articles stored covering a plurality of aisles. Thus FIG. 3 shows, for instance, that articles of the items A and H are available for delivery from the aisle I, while articles of the items B and C can be delivered from the aisle II. In like manner, FIG. 5 shows the possibility that articles of the items A and H can be delivered from the aisle I, and articles of the items A and B from the aisle II.

Now, the link association system according to the present invention will be described more in detail with reference to Table I and II to facilitate the understanding of the part of the specification described below.

In order to more clearly indicate the difference between the link association system of the present invention and a conventional storage system, the following comparison is made employing the item designations utilized, for example, in FIG. 2 or 4 of the drawings of this application.

| TABLE I | | TABLE II | |
|---|---|---|---|
| Conventional System | | Link Association System | |
| Aisle I | A C | Aisle I | A    D |
| Aisle II | A C | Aisle II | A B |
| Aisle III | B D | Aisle III |    B C |
| Aisle IV | B D | Aisle IV |      C D |

The difference in effects between the link association system and the conventional storage system is as follows:

In the conventional storage system if the aisle II, for example for some reason becomes out of order, the handling of all the load expected to be apportioned to aisle II, namely the handling of the demand related to the items A and C, must be concentrated on and carried out by aisle I with the result that the balance of load among the aisles I, III and IV is lost to a large extent.

In contradistinction, in the link association system according to the present invention, if the aisle II, for example becomes out of order, the handling of all the load expected to be apportion to such aisle, namely the handling of the demand related to the items A and B may be carried out by both the aisles I and III. As a result, if either one of the aisles I and III become overloaded, a part of the load of both the aisles I and III, namely the handling of demand related to the items C or D may be allotted to the aisle IV thereby reducing the overload on the aisles I and III. Thus, by the structural arrangement of articles common to a plurality of aisles as illustrated in FIGS. 3 and 5 of the drawings of this application, a highly improved warehousing system is provided through the link association system whereby low balance can be adjusted among the aisles through the computer controlled arrangement as disclosed in this application.

Thus, as seen from the above comparison chart and the above discussion, the link association system is such that the aisles I and II are associated with each other through the item A, the aisles II and III are associated through the item B, the aisles III and IV are associated through the item C, and the aisles IV and I are associated through the item D. Thus, the aisles I to IV are link associated with one another to form a ring-like association. This in an essential point of the present invention.

Figure 6:
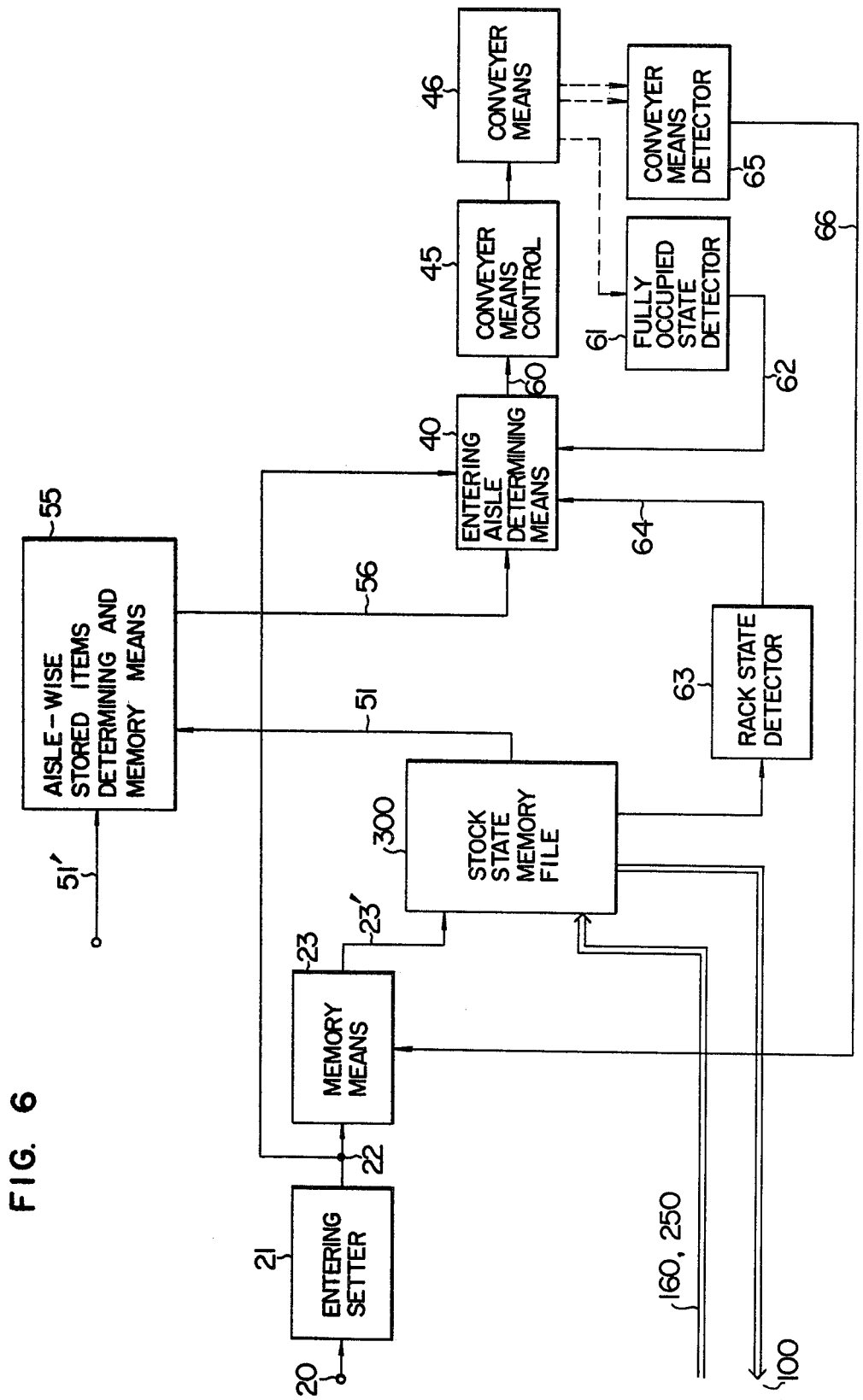
FIG. 6 is a block diagram showing a entering apparatus and means for determining entering aisles.

A specific example of entering articles in accordance with the storage pattern actually determined by the aisle-wise stored items-determining and memory means 55 (described in detail later) will be explained below with reference to FIG. 6.

Generally, when articles of an item are entered or warehoused, entering information 20 is first set in the entering setter 21 for palletized articles in a plurality of pallets. The entering information signal 22 is stored in a memory means 23 and at the same time applied to an entering-aisle determining means 40 for determining at least one entering aisle. To the entering-aisle determining means 40 are applied an output signal 56 of the memory means 55 for determining the entering aisles of the pallets to be stored, a detection signal 62 produced by a detector 61 for detecting the fully occupied condition of the storage line conveyer, and a detection signal 64 produced by a detector 63 for detecting the rack state of each aisle.

A signal 60 produced as a result of determining an entering aisle is applied to means 45 for controlling a conveyer means 46 whereby articles in a pallet to be stored are conveyed to the storage line conveyer of the aisle thus determined. And the stacker crane associated with the particular aisle places the pallat thus conveyed on the storage line conveyer at an appropriate position of the high-stored racks. In the process, the state of the storage line conveyer on the entering side is examined by the fully-occupied condition detector 61, so as to suspend the controlling of the conveyer means to receive a new pallet if a fully-occupied condition is detected. A conveyer means detector 65 is provided for the purpose of ascertaining that the pallet to be stored have been actually moved to the storage line conveyer of the aisle concerned by the conveyer means in response to the entering-aisle determining signal 60, and it causes a signal 66 to be fed back to the memory means 23. The memory means 23 is for updating the information stored in a stock state memory file 300 by means of a signal 23', while at the same time resetting the memory signals for the memory means 23. The information stored in the stock state memory file 300 is further updated by means of state signals 160 and 250 due to a delivery, thus updating its memory in accordance with the variations in the stock due to entering and delivery operation.

The aisle-wise stored items determining and memory means 55 may be actuated at any desired timing, which generally dose not coincide with the entering processing timing. In other words, the timing of determination of the aisle-wise stored items coincides with the time point at which a new storage item information 51' including the data the number of items of the articles to be newly stored, the names of the items and the forecast mobility of the respective items is applied to the means 55.

Figure 7:
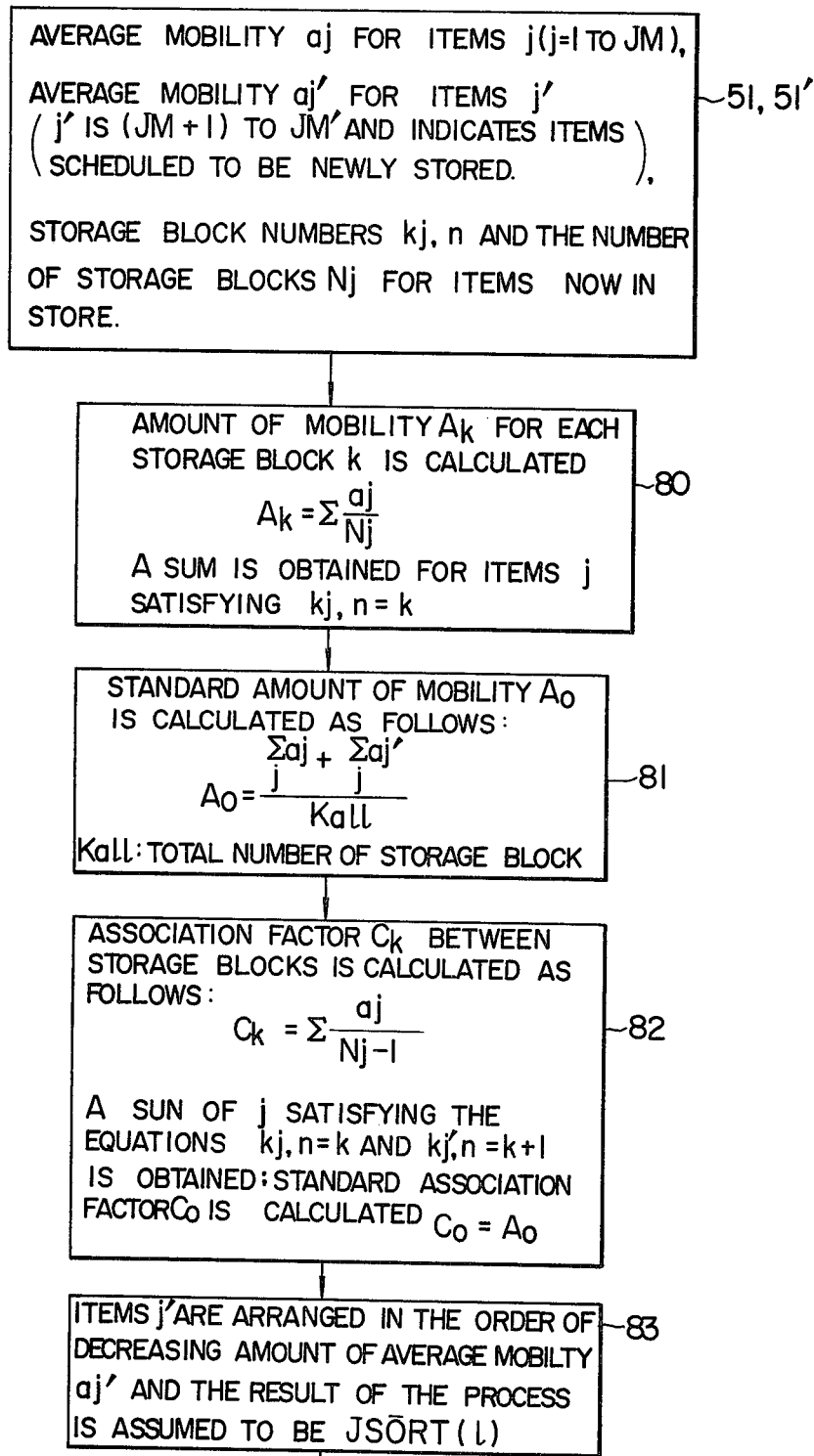
FIG. 7 is a flow chart for explaining the logics of operation of a means included in FIG. 6 for determining items to be stored in each of the aisles.

The logics of the aisle-wise stored items determining and memory means 55 will be explained with reference to FIGS. 7, 8 and 9. Referring first to FIG. 7, an input signal 51 represents the items $j$ ($j$ being from 1 to JM), the average mobility $a_j$ for the items $j$, that is, an average amount of articles of each of the items $j$ delivered per day, the item $j'$ which are scheduled to be stored in the future ($j'$ being from JM + 1 to JM'), the average mobility $a_j'$ for the items $j'$ the storage block number $k_{j,n}$ for each of the items $j$ presently stored and the number $N_j$ of the storage blocks for the items $j$. These input signals will be explained below more in detail with reference to the general logics of storage and the cases of FIGS. 4 and 5. In FIGS. 4 and 5, the input signal corresponds to such a condition that the sequence number $j$ represents the items A to H and the number $N_j$ for each item is 2.

A caluculator means 80 is for calculating the amount of the storage items' mobility $A_k$ for each storage block, where $A_k$ may be obtained by summation in accordance with the equation $A_k = \Sigma\, a_j/N_j$ with respect to the items $j$ which satisfy the equation $k_{j,n} = k$. A calculator means 81 calculates the standard value $A_O$ of the sum of mobilities. The amount $A_O$ may be expressed by the equation $$A_o = \frac{\sum_j a_j + \sum_{j'} a_{j'}}{K_{all}}$$

The symbol $K_{all}$ here shows the total number of storage blocks, the symbol $A_o$ showing an average amount of mobility for each aisle, with respect to the items including both the presently stored items $j$ and the newly stored items $j'$.

Further, a calculator means 82 calculates an inter-block association factor $C_k$. The factor $C_k$ may be obtained by summation in accordance with the equation $$C_k = \Sigma \frac{a_j}{N_j - 1}$$

with respect to item $j$ which satisfies the equations $k_{j,n} = k$, and $k_{j,n'} = k + 1$.

The inter-block association factor $C_k$ represents the degree of association between the storage blocks in which the same $j$-th item of articles are stored.

The standard association factor is defined as the average amount of mobility per se, namely $C_O$ is assumed to be $A_O$. That is to say that a ring is constituted by making association with imaginary lines connecting respective storage blocks with respect to common item of article, and the degree of association is defined by the amount of mobility.

Moreover, a calculator means 83 arranges signals representing the items $j'$ out of the input signals 51' in order of the decreasing amount of average mobility $a_j'$, the result of the arrangement being assumed to be JSORT($l$). Namely, JSORT($l$) represents the total of table with respect to the items $j'$ which is rearranged in the decreasing order of the amount of average mobility $a_j'$, and JSORT(1), which is the value of JSORT($l$) when $l$ is 1, represents the item whose $a_j'$ is the largest among the items $j'$.

Figure 8:
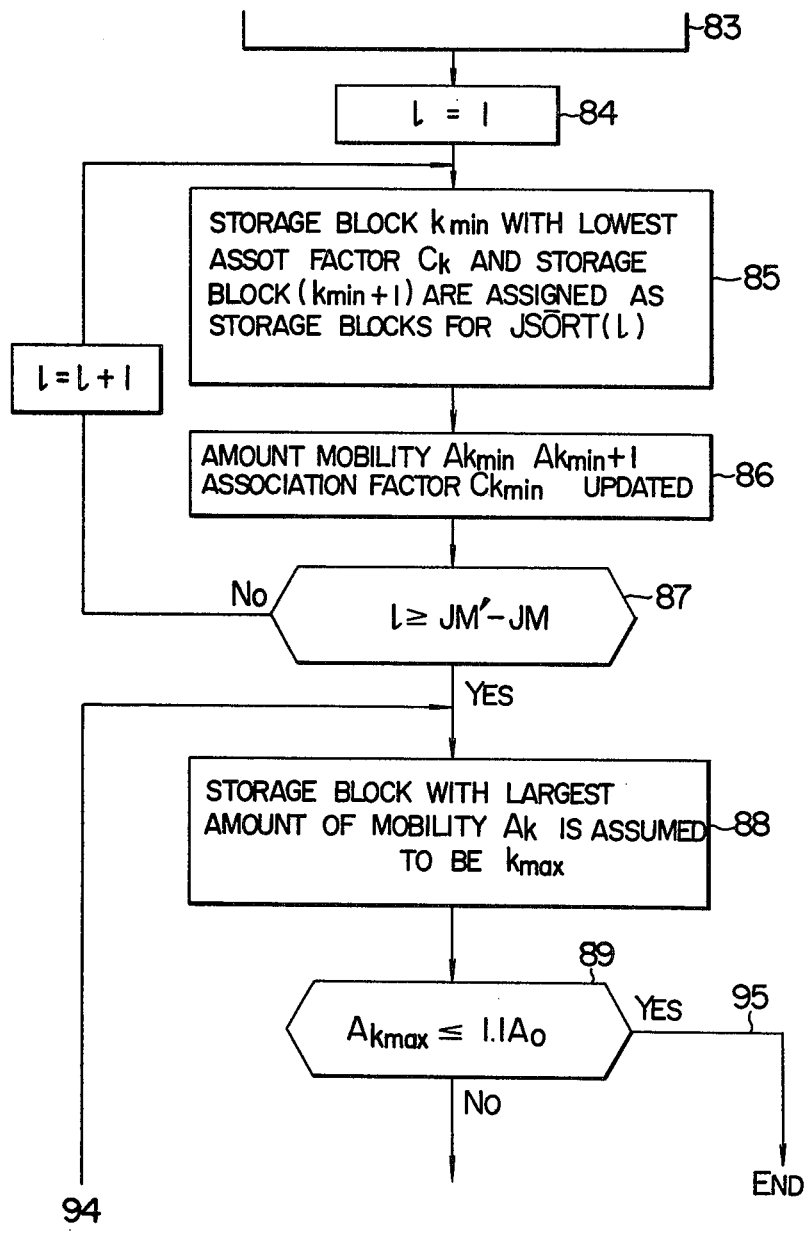

In FIG. 8, calculator means 84 determines the initial value of $l$ to be 1, and calculator means 85 allots the items JSORT($l$) both to the storage block $k_{min}$ where the association factor $C_k$ is minimum and to the adjacent storage block ($k_{min}$ + 1). In other words, when $l$ is 1, an item with the highest average mobility among the items $j'$ is allotted.

The calculator means 86 is provided for the purpose of calculating the association factor $C_{k_{min}}$ and the mobility amounts $A_{k_{min}}$ and $A_{k_{min}+1}$ resulting from the allotment by the calculator means 85. The decision means 87 examines as to whether or not calculations have been completed for all items to be newly stored. If it is found that calculations have been completed for all items, $l$ is updated to $l + 1$ thereby to repeat calculations. Here, since JM represents the number of items of articles which have already been stored in the automated warehouse and JM' represents the number of items of articles including both the ones which have been stored and the ones which will be newly stored in the near future in the warehouse, (JM' — JM) indicates the number of items of articles which will be newly stored in the near future in the warehouse. Accordingly, when $l$ = (JM' — JM) it means that the calculation by the calculator means 85 and 86 with respect to the items to be newly stored has been completed.

The results of the calculations are used by calculator means 88 to search a storage block with the greatest mobility amount, thus determining the storage block $K_{max}$. Decision means 89 operates in accordance with the logics of the calculator means 90 and subsequent stages only when the mobility amount $A_{k_{max}}$ of the storage block $k_{max}$ is greater than the standard mobility amount $A_o$ by more than 10%, whereas if $A_{k_{max}}$ is 1.1 × $A_o$ or less, the allotment of new items $j'$ to be stored for each aisle is completed in the aforementioned manner.

The operation of the present embodiment will be explained more in detail with reference to the case where $A_{k_{max}} \not\leq 1.1 \times A_o$. In FIG. 9, the decision means 90 determines whether the difference between the association factor $C_{k_{max}}$ of the storage block $K_{max}$ and the association factor $C_{k_{max}-1}$ of the storage block ($k_{max}-1$) is positive or negative, so that calculations are made in calculator means 93 through calculator means 91 or 92 according to whether it is positive or negative, respectively. In other words, correction is made in such a manner that an item which is stored in the storage block $k_{max}$ and which is nearest to ($A_{k_{max}} - A_o$) in mobility satisfying the inequality (1) shown below, is selected and newly stored in the storage blocks $k'$ and $k''$.

$$a_j - (A_{k_{max}} - A_o) < 0 \tag{1}$$

Accordingly, the present stock in the storage block $k_{max}$ is considered to be an exceptional storage.

The calculator means 94 calculates the corrected mobility amounts $A_{k_{max}}$ and $A_{k''}$ for the storage blocks $k_{max}$ and $k''$ respectively as well as the association factors $C_{k'}$ and $C_{k'''}$. Corrections are subsequently repeated through the calculator means 88 and decision means 89 until the decision means 89 is satisfied thereby to produce an output information signal 95.

The output information signal 95 represents items to be stored in the storage blocks of the block numbers $k_{j,n}$ for items $j'$, and the items whose storage blocks are subjected to change among the items $j$. When the conditions of the decision means 89 are not satisfied in FIG. 8, it shows that there is a great difference between the amounts of mobility between the storage blocks, which difference is corrected by a logic section including the decision means 90 and the stages subsequent thereto.

The entering aisle determining means 40 in FIG. 6 will be explained with reference to the flow chart of FIG. 10. The entering information supplied by the entering setter 21 represents the items $j$ and the entering amount $\Delta y_j$. (The items $j$ here include the abovementioned items $j$!) Further, the storage block numbers $k_{j,n}$ and the amount of storage $YY_{k,j}$ for the items $j$ are represented by the input information 96 for determining entering aisles. Decision means 97a checks the rack state in response to the rack condition detection signal 64, while another check means 97b examines the space of buffer storage line conveyers, check means 97c determining whether or not storage is possible. What is more, check means 97d determines whether or not the conveyer means of the storage blocks is out of order. After these check means make sure that the entering is possible, entering aisles and entering amount for each storage block are determined by storage amount determining means 99.

Explanation will be made now of storage block selector means 98 and 98'. The storage block selector means 98 is for selecting blocks available for storage in the case of exceptional processing. In the absence of a storage block already occupied for exceptional storage, blocks are selected in sequence beginning with the storage block adjacent to the particular block, and such blocks are selected as $k_{j,N_j+1}$ ($NN_j = 1$).

The storage block selector means 98', on the other hand, makes use of the number $N_j$ of storage blocks corresponding to the storage blocks $k_{j,n}$ which is an output of the block-wise storage items-determining and memory means 55 and assigned as $NN_j (NN_j \leq N_j)$.

Apart from the entering of articles in the warehouse, description will be made now of the case in which the articles stored in the aforementioned manner are delivered from the warehouse.

Reference will be made to the storage pattern shown in FIG. 4 as an actual example. Assume that a customer has made a delivery requisition for a plurality of items as follows:

$$[A^2, B^1, C^1, D^2, E^3]$$

where $A^2$, for instance, shows that the customer has placed an order for two pieces of articles of item A, and the same can be said of the other B, C, D and E. The automated warehouse in this case, as shown in FIG. 11a, comprises eight storage blocks I to VIII containing $A^a$, $H^b$, $A^c$, $B^d$, ... $G^p$, $H^q$ respectively. The storage blocks construct the three groups, such as one with the all blocks shown in FIG. 11a, one with the even-numbered blocks as shown in FIG. 11b, and one with odd-numbered blocks as shown in FIG. 11c.

It is assumed that, when requisitions for the above-mentioned delivery are made by a customer, the block group of FIG. 11a is assigned on the basis of the factors affecting the work balance between the storage blocks. Incidentally, the embodiment under consideration is such that which of the three block groups is assigned for delivery is determined by calculator means which will be described later, and the warehouse as a whole is considered as one of the block groups including groups of FIGS. 11a, 11b and 11c, for the purpose of selection of a group from which articles are to be delivered. The numerals shown in the third row in FIG. 11a for each storage block, represent the total number of the respective quantities of the articles to be delivered of the items which are in common with the items contained in storage blocks. As to the storage block I which contains $A^aH^b$, for example, the item to be delivered is A and its quantity 2. The same can be said of storage blocks II to VIII. Indexes $a$ to $q$ attached to the symbols $A^a$ to $H^q$ representing the stored articles, indicate the number of articles of the item concerned and, here in the example, is larger than any of the amount of articles to be delivered.

As will be seen from the numerals in the third row in FIG. 11a, two pieces of item D and three pieces of item E are delivered from the storage block V for the total of five articles. The numerals in the fourth row show the number of pieces of items except D and E for which delivery requisition has been met, and that the storage block II containing the greatest number of three. In the fifth row, both storage blocks III and IV contain one article, and in such a case as this the delivery is made from the storage block of a smaller number, that is, from the storage block III. Consequently, the delivery requisition $[A^2, B^1, C^1, D^2, E^3]$ is met by the delivery from three storage blocks II, III and V and therefore the concentration work amount affecting factor is 3.

The diagrams of FIGS. 11b and 11c show cases similar to the one shown in FIG. 11a, in which delivery from storage block groups is made in accordance with the same delivery requisition $[A^2, B^1, C^1, D^2, E^3]$.

The above description refers to the division of storage blocks into storage block groups and procedures for determining the storage block from which delivery is to be made, after a selection of a storage block group. And explanation will be made now of an embodiment of the invention which handles the construction of the invention as a whole taking into consideration the balance of work amount between storage blocks and the minimization of the concentration work amount.

Figure 12:
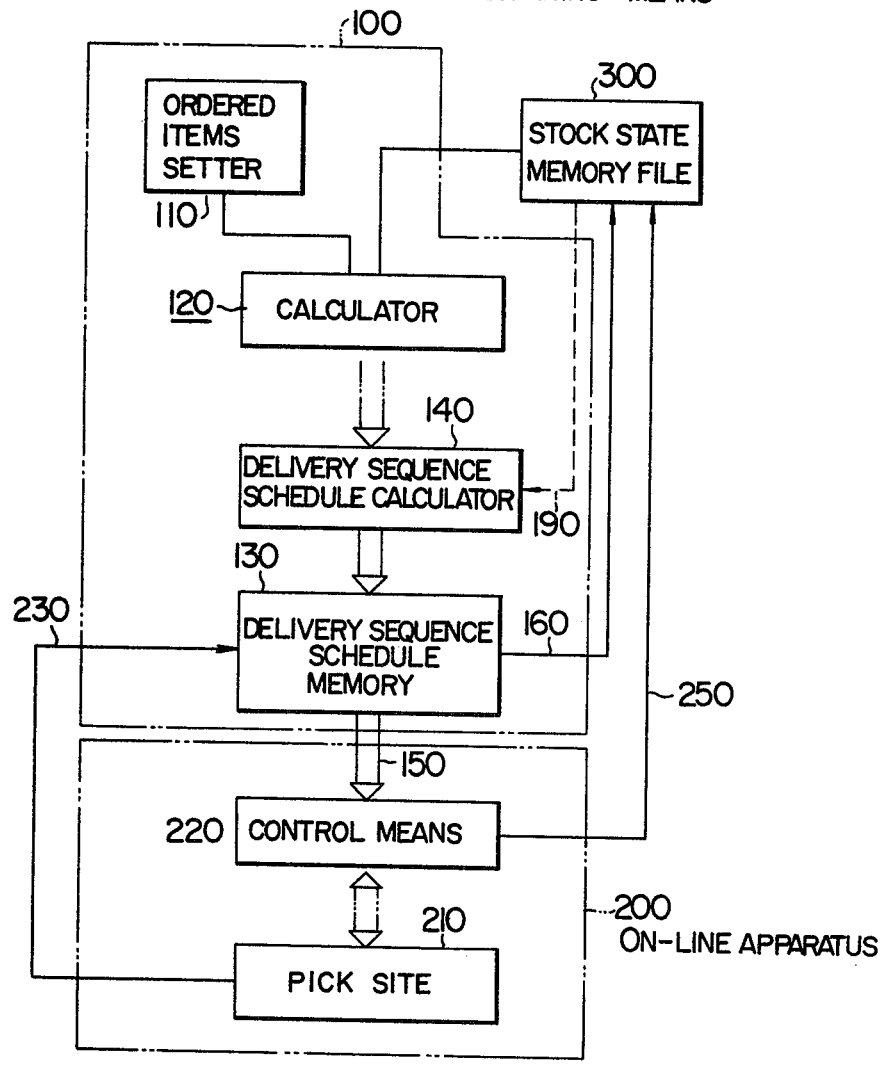
FIG. 12 is a block diagram showing a delivery management means.

The construction of the present invention is roughly divided into two sections; a calculator section for calculating a delivery schedule for unit time, say, one day, and a section which actually operates on line, as the relation therebetween is shown in FIG. 12.

Reference numeral 100 shows the whole construction of an optimum delivery schedule determining means to meet the delivery requisition from a plurality of customers, and it comprises means 110 for setting the quantity of ordered items by customer, means 120 for calculating the affecting factors by customer and by storage block group, for the stock amount, work balance, and the concentration work amount, means 140 for calculating the delivery sequence schedule and a delivery sequence schedule memory means 130 for storing the delivery sequence schedule for each day.

On the other hand, the on-line apparatus 200 operating on line comprises control means 220 for controlling the cranes and conveyers in response to an output signal 150 of the sequence memory means 130 and other means, so that articles are transported to the pick site 210, a signal 230 representing the items and quantity of the articles picked up is fed back to the memory means 130, and a confirmation signal 160 is applied to a warehouse state memory file 300. An output signal 250 from the control means 220 is produced when such apparatuses as the crane and the conveyer begin to operate according to a specific schedule, the information contained in the stock state memory file 300 being updated by the confirmation signal 160 and the signal 250. The file 300 keeps in memory the stock state of the warehouse as a whole and its content is subject to the continual updating to indicate the current stock state.

The whole construction of the delivery schedule determining means will be explained more in detail with reference to FIG. 13.

Reference numeral 120 shows a calculator means which includes a storage block stock amount calculator 120-1 for calculating the stock amount affecting factor by customer and by storage block group, a work balance calculator 120-2, and a concentration work amount calculator 120-3, thus calculating the three evaluation parameters for the respective storage block groups for each customer. In the process, calculations are made for every combination of the plurality of delivery command signals and the storage block groups, so that a storage block group is determined by the block group selector means 180 of the calculator means 120 in view of the need to achieve optimum stock amount and work balance as well as to minimize the concentration work. In starting the calculation, automatic setting is made by the signal 190 by the use of a parameter necessary for calculations concerning the automated warehouse, say, the stock amount of the blocks needed for determining the delivery sequence schedule. These data are used by the calculator means 140 as an initial condition to determine the delivery schedule for each block group corresponding to the delivery command signal of each customer.

The delivery sequence schedule for, say, each day which is formed by the aforementioned repetition of the calculating operations is stored in the sequence memory means 130. The on-line apparatus 200 effects the delivery in accordance with the delivery sequence schedule stored in the memory, in which case the information stored in the memory file 300 is updated with the progress of the delivery operation thereby to keep abreast with the stock amount of the warehouse.

In the case that the warehouse is divided into the three storage block groups of FIGS. 11a, 11b and 11c in making calculations for every combination of the plurality of customers and the plurality of storage block groups through the calculator means 120 of FIG. 13, a logical decision will be made first on FIG. 11a or FIG. 11b. If this decision fails, the result is necessarily a solution of FIG. 11c, thus greatly facilitating the logical decision and leading to the advantage of a reduced memory capacity used for the calculations.

The means 100 shown in FIG. 13 for determining the optimum delivery schedule in compliance with requisitions by a plurality of customers will be explained below more in detail with reference to FIG. 14 and FIG. 15.

Figure 14:
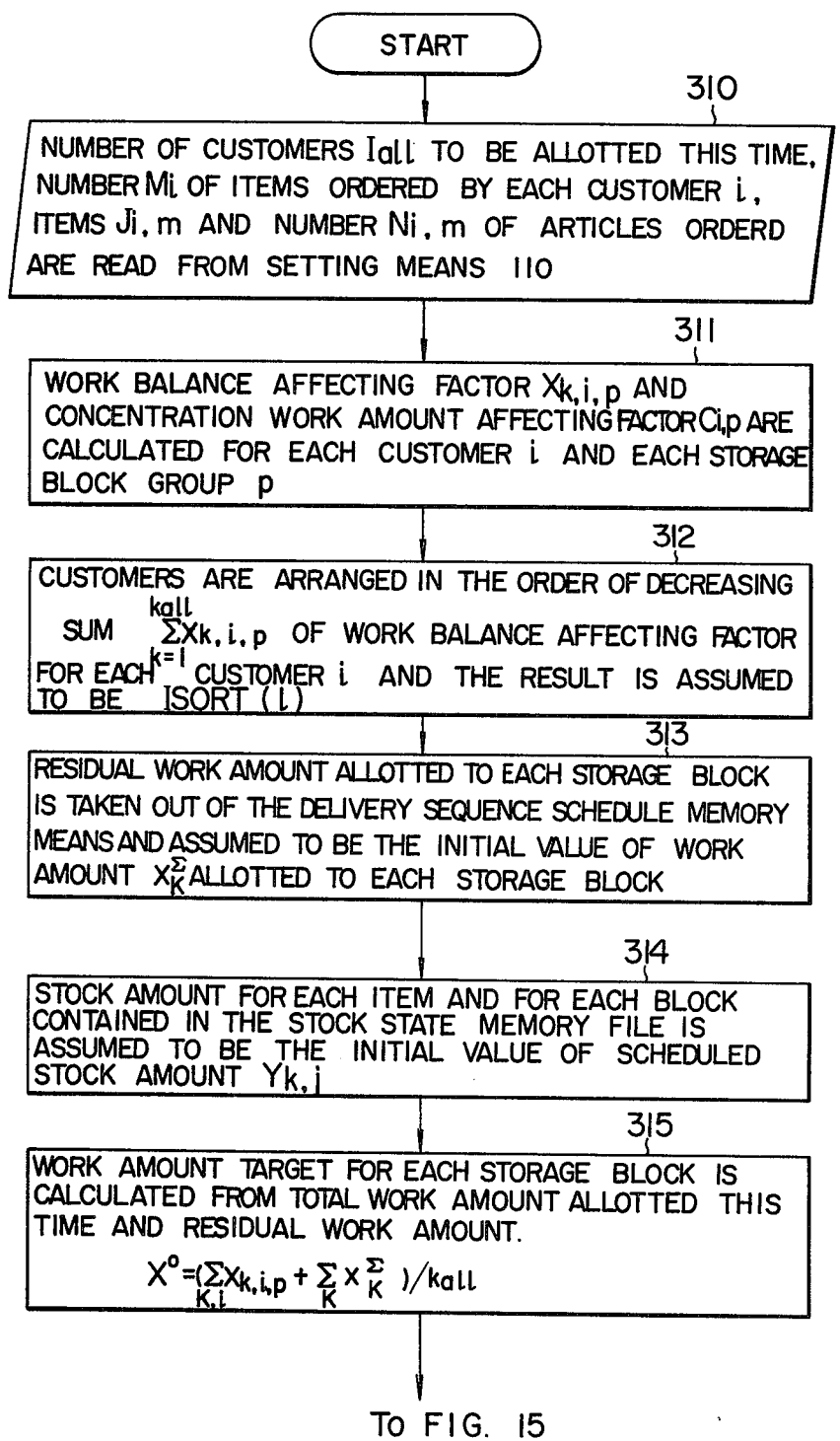
FIGS. 14 and 15 are a diagram for explaining the logics of an optimum delivery schedule determination means included in FIG. 13.

Referring first to FIG. 14, the input means 310 reads from the setting means 110 the information concerning the current allotment requirement for delivery. The calculator means 311 calculates the work balance affecting factor and the concentration work amount affecting factor for each storage block group in the manner similar to that mentioned already with reference to FIG. 11.

The work balance affecting factor $X_{k,i,p}$ and the concentration work amount affecting factor $C_{i,p}$ are calculated with respect to every customer $i$ and every storage block group $p$. When the articles of the $m$-th item among the delivery demanded items of a customer $i$ exist in the $k$-th storage block and if the $k$-th storage block belongs to the $p$-th storage block group, i.e., $k \epsilon p$, the factor $X_{k,i,p}$ may be obtained by summation with respect to the item in question as follows:

$$X_{k,i,p} = \sum_m N_{i,m}$$

However, in the case where the $k$-th storage block does not belong to the $p$-th storage block group, i.e. $k \ p$ sum is obtained by $N_{i,m} = 0$ for every customer $i$ with respect to the delivery demanded items of the customer $i$, i.e. $X_{k,i,p} = 0$.

$C_{i,p}$ represents the number of storage blocks when the articles of the delivery demanded items $J_{i,m}$ of the customer $i$ may be delivered out of the $p$-th storage block group and is detected with respect to every storage block group. For example, if the articles of the items $J_{i,m}$ may be delivered out of two storage blocks belonging to the $p$-th storage block group, the value of $C_{i,p}$ is two or $C_{i,p} = 2$.

Figure 13:
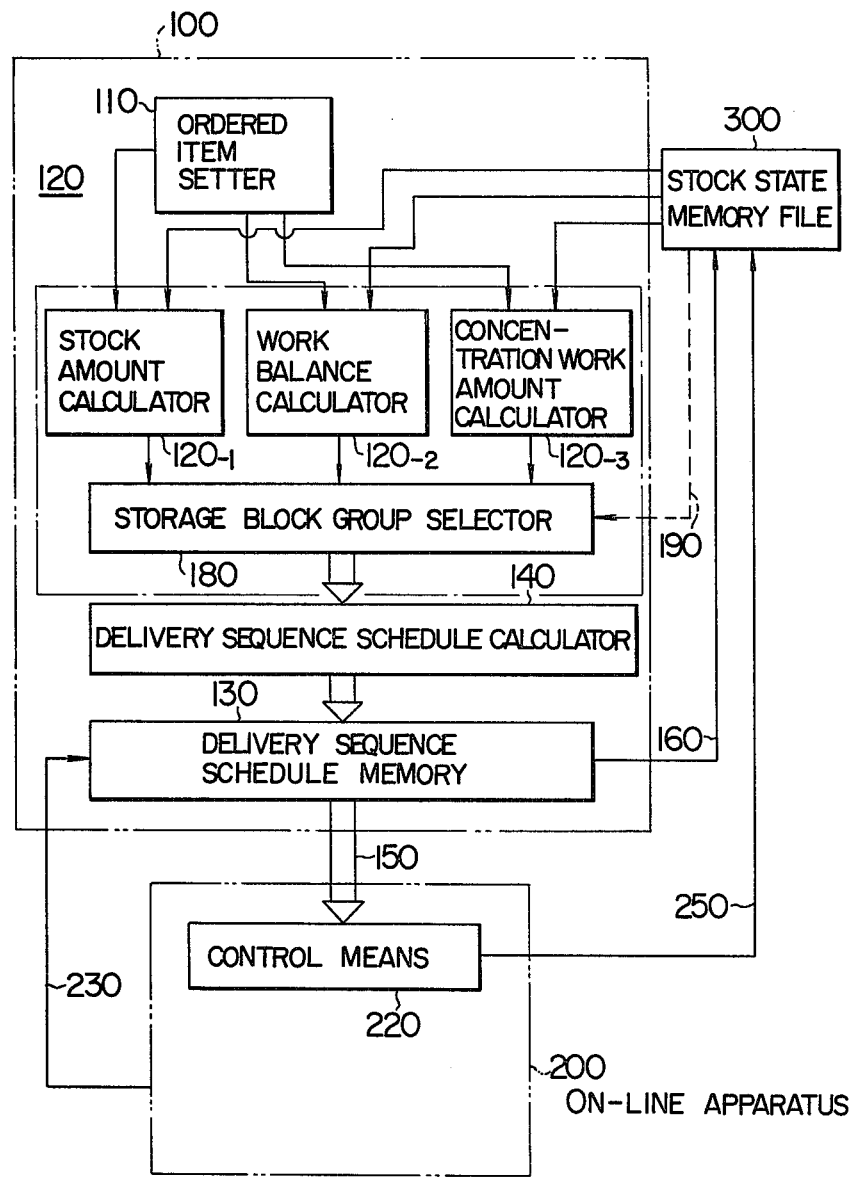
FIG. 13 is a block diagram showing a delivery schedule calculator included in the means of FIG. 12.

In this general flow chart, the calculator means 311 does not include any stock amount calculators corresponding to $120_{-1}$ shown in FIG. 13. Explanation in this connection will be made later as a feasibility check with reference to numeral 320.

Also, the calculator means 312 calculates the sum of the work balance affecting factor for each customer $i$ and arranges them in the order of decreasing amount. The initial value setting means 313 and 314 are provided for the purpose of setting the initial values of the already allotted work amount and scheduled stock amount. Numeral 315 shows target work amount calculator means for calculating a target work amount for each storage block on the basis of the total work amount to be newly allotted and the residual work amount.

Numeral 316 shows initial value setting means for setting $l$ at 1 in the value of $\overline{ISORT}(l)$ derived from the above-mentioned means 312. The work balance check means 318 performs the checking operation at 80% of the target work amount. Numerals 319 and 319' show storage block group selector means for selecting a storage block group on the basis of the difference from the target work amount, and numeral 320 shows a stock amount determining means for determining whether or not the stock amount covers the amount required to be delivered. In the event that the stock amount is less than the required delivery amount, a storage block is re-allotted by the storage block changing means 321. The already allotted work amount and the scheduled stock amount are updated by the calculator means 322, whereupon the decision means 323 examines whether or not the calculations have been completed for every customer. After that the order of delivery is determined and stored in the sequence memory means.

Apart from the foregoing brief description of an embodiment of the invention, an example of the entering aisle determination associated with FIG. 10, and the determination of the optimum delivery schedule associated with FIGS. 14 and 15 will be described with reference to the detailed flow chart of FIGS. 16 to 22.

Variables used in this flow chart and the definition thereof, as related to the corresponding symbols mentioned above are collectively illustrated hereunder. (All the variables shown below are integers.)

DEFINITION/CORRESPONDING SYMBOLS OF VARIABLES USED IN FLOW CHART

| Variables | Definitions and Corresponding Symbols |
|---|---|
| IALL: | Iall |
| PRI (I): | Priority of processing of orders from customer i involved. |
| MI(I): | $M_i$ |
| JIM (I, M): | $J_{i,m}$ |
| NIM (I, M): | $N_{i,m}$ |
| I: | i |
| M: | The sequence number of an order by one customer. |
| XKIP (K, I, P): | $X_{k,i,p}$ |
| CIP (I, P): | $C_{i,p}$ |
| KALOT (KD,PI,I): | Storage block from which delivery is made to customer i for the KD-th time when PI storage block group is selected. |
| PALL: | Total number of storage block groups. |
| K: | k |
| P: | p |
| XSUM (I): | Sum (or partial sum) of orders from customer i. |
| KALL: | $K_{all}$ |
| ISORT (l): | Such series of parameters of data, that the datum is the l-th order in value. |
| XZK (K): | $X_k^2$ |
| NSCH (K): | Number of processes involved in registration schedule for storage block k. |
| ZFILE (K, J): | Stock amount of item J at storage block k (=$YY_{k,j}$). |
| JM: | JM |
| J: | j |
| XOSUM: | Work variables. |
| XO: | $X^o$ |
| PMIN: | $P_{min}$ |
| PMAX: | $P^{max}$ |
| KMIN: | $K_{min}$ (FIGS. 14 and 15) |
| KMAX: | $k_{max}$ (FIGS. 14 and 15) |
| PI: | $p_i$ |
| NNIM (ISCH, K): | Delivered amount in accordance with registration schedule of storage block k and work number ISCH. |
| INAME (ISCH, K): | Name of customer associated with each k and ISCH. |
| PRIOR (ISCH, K): | Priority of order processing for each k and ISCH. |
| TENSU (K): | Total amount deliverable from storage block k to a customer (or partial sum thereof). |
| KPAT (P, K): | "1" when storage block k belongs to storage block group p; and "0" when not. |
| YKJ (K, J): | $Y_{k,j}$ |
| TSORT (l): | Such series of parameters of data that the datum is the l-th order in value. |
| WALOT (M): | "1" when the M-th order has already been alotted; and "0" when not. |
| DYJ: | $\Delta Y_j$: Entering amount of item j (By way of explanation, it is assumed to be the number of pallets for the present purpose). |
| KJN (J, N): | $k_{j,n}$ |
| ATOTAL: | Total amount storable in a storage block. |
| SPACE (K): | Buffer storage space available in storage block k. |
| NJ (J): | $N_j$ |
| NNJ: | Work variable. |
| KOSYO (K): | "1" when storage block k is out of order; "0" when not. |
| REIGA: | "1" when exceptional entering process is involved; "0" when not. |
| NYUKO (N): | N-th entering aisle. |
| AMARI: | Work variable. |
| SYO: | Work variable. |
| SNPJ (J): | Standard amount of item j stored in a pallet. |

Figure 16:
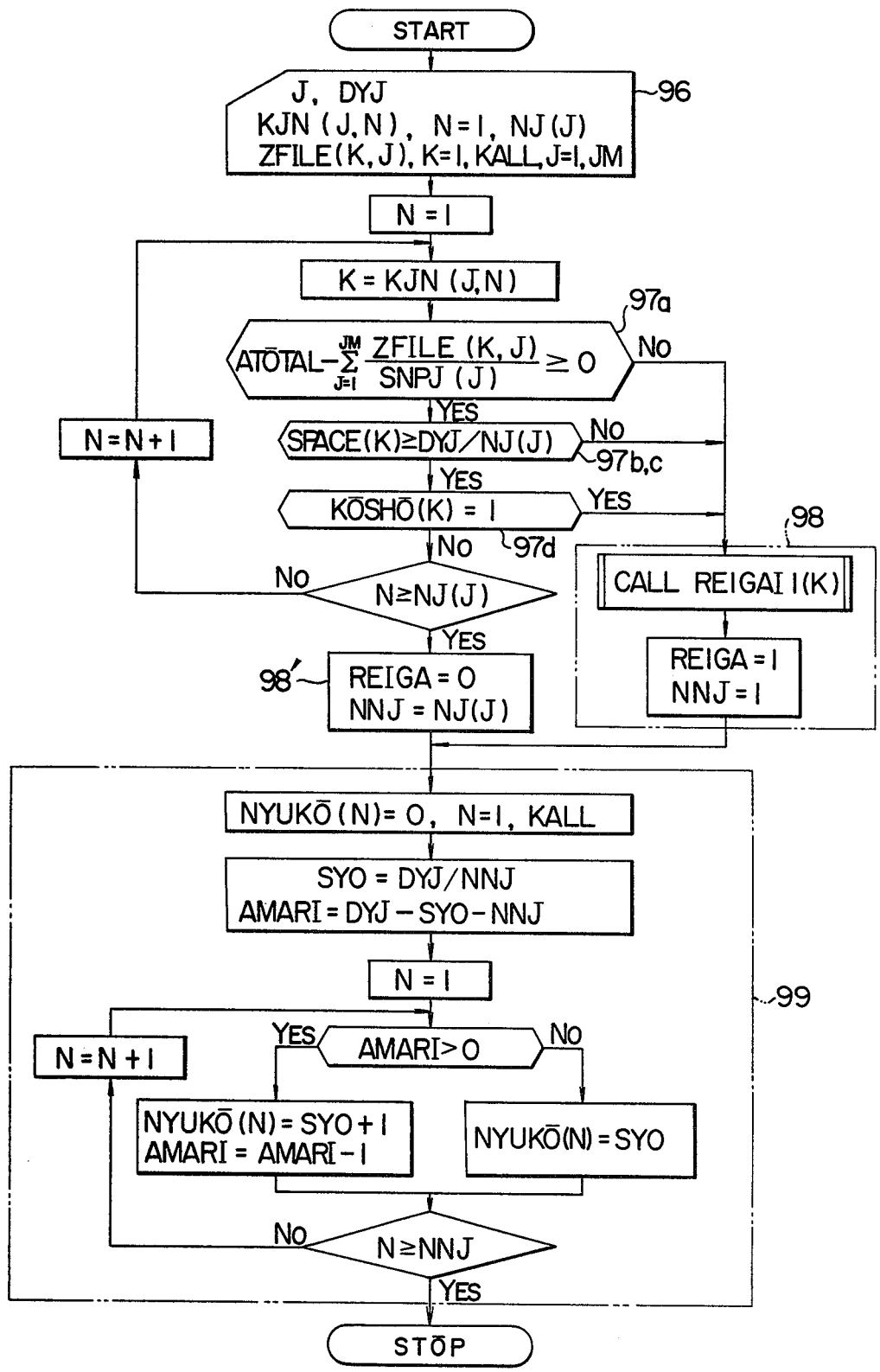
FIG. 16 is a flow chart showing the detail of the entering aisle-determining means illustrated in FIG. 10.

A flow chart corresponding to FIG. 10 is shown in detail in FIG. 16 where like component elements are denoted by like numerals in FIG. 10.

To facilitate the understanding, the entering amount $\Delta Y_j$ is shown by the number of pallets in FIG. 16. In practical cases where all pallets are not necessarily filled to capacity, the exact number of articles is set. But, the fundamental part of logics is the same in this case as in FIG. 16. Of the blocks shown by numeral 98, REIGAI (K) is a function for determining the entering storage block k in such an exceptional case as a trouble of the storage block intended to be entered or for other reasons, the detailed explanation of REIGAI (K) being omitted.

Figure 15:
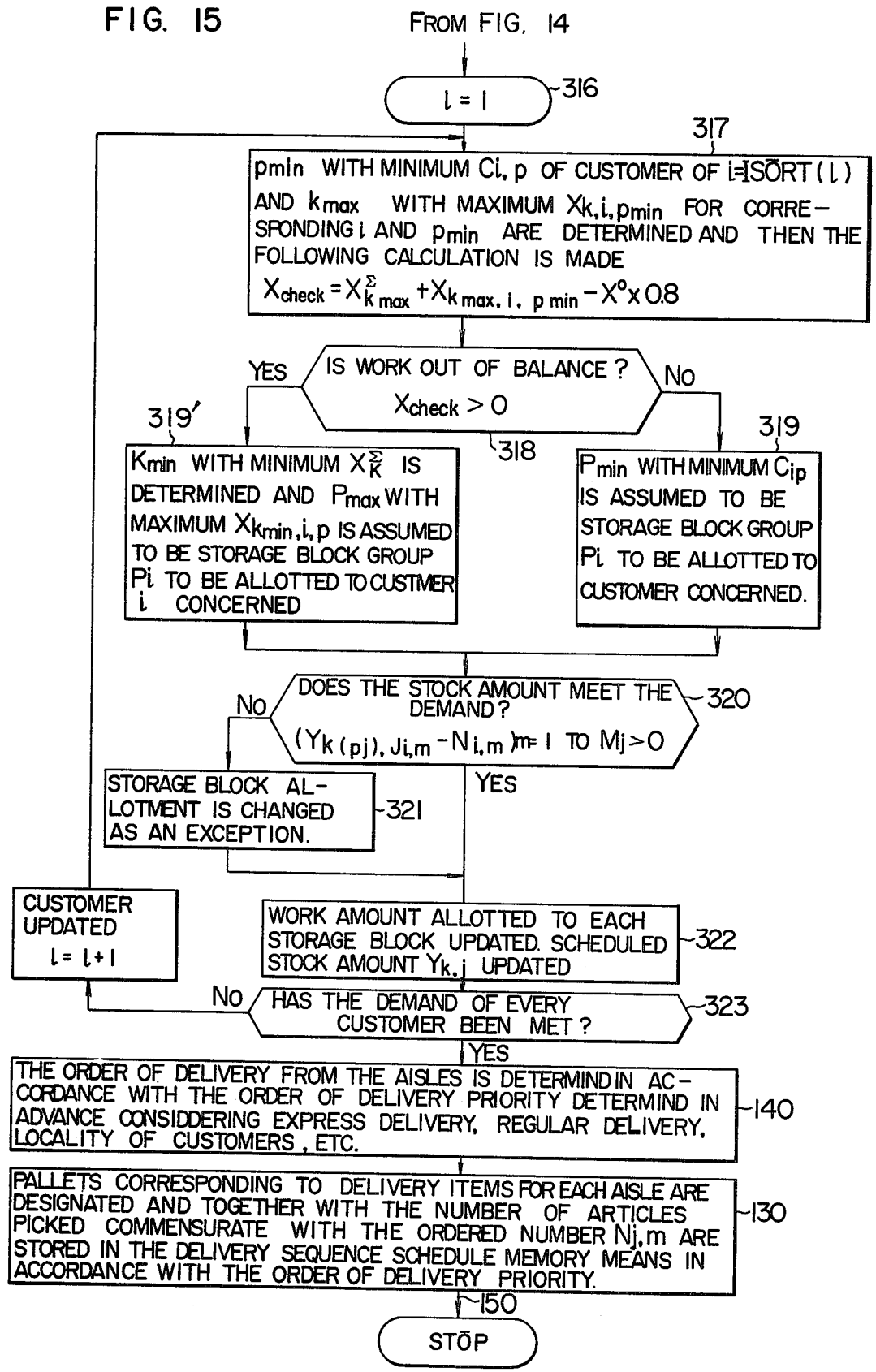

FIGS. 17 to 20 show an example of the detail of the flow shown in FIGS. 14 and 15. Additional explanation will be made of the subroutine access CALL AFFECT shown by numeral 311. The subroutine AFFECT (I, P, XKIP, CIP, ... ) is for determining the work balance-affecting factor $X_{k,i,p}$ and the concentration work amount-affecting factor $C_{i,p}$ in accordance with the storage block group p of 1, 2 and 3. The detail of this subroutine will be explained later with reference to FIGS. 21 and 22.

The subroutine SORT (I, X, JS) called within the block shown by numeral 312 is often used for sequencing process, and operates in such a manner that the data X (l) in the number of I are arranged in the order of increasing amount, so that affixes l are stored in JS (J) in that order.

Figure 19:
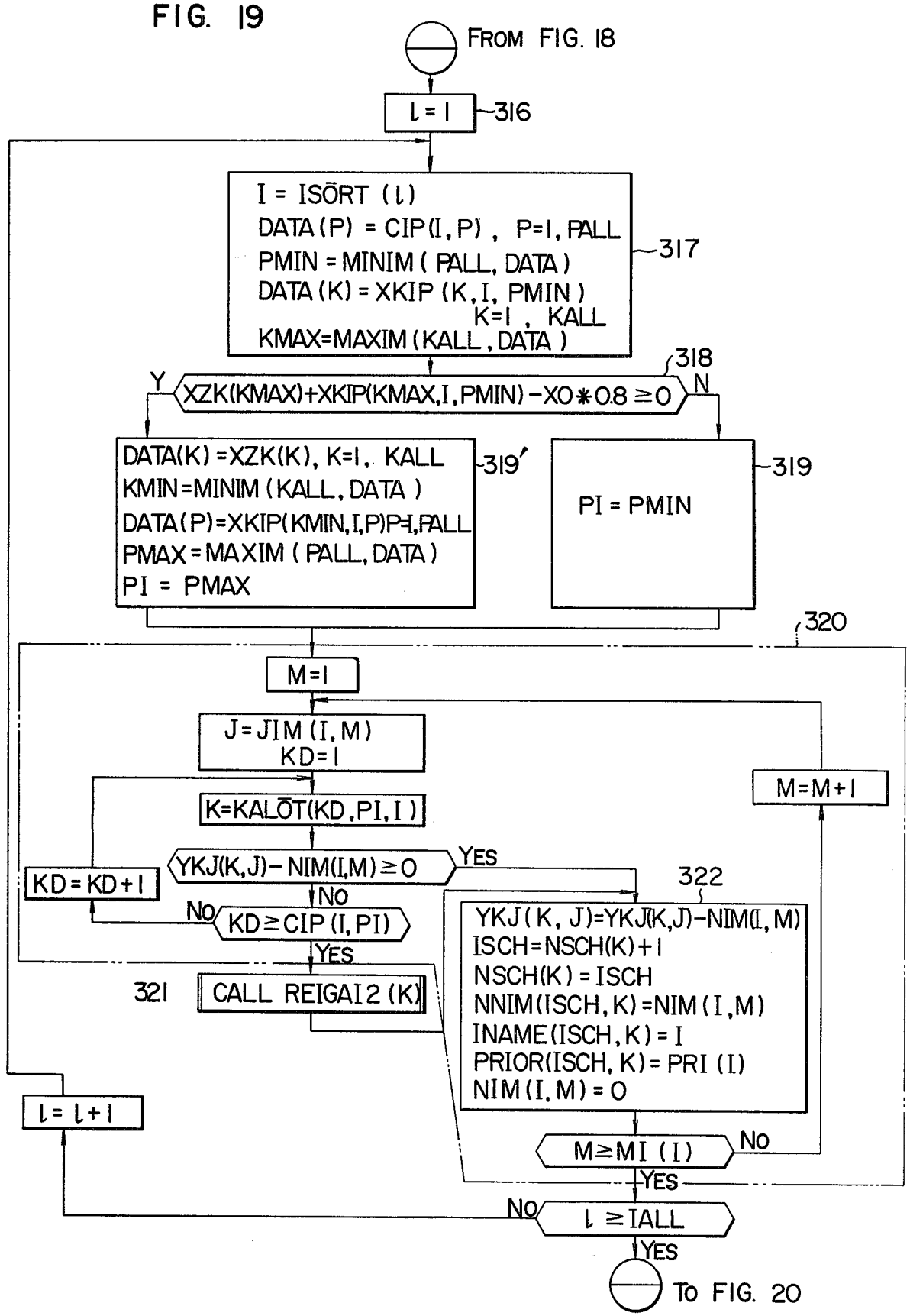

The subroutine CALL REIGAI2 (K) in the block shown by numeral 321 in FIG. 19 is for determining the exceptional aisle K in the rare case of stock shortage and will not be explained in detail here.

Figure 20:
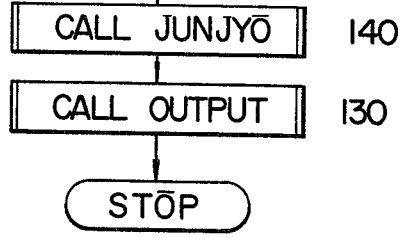

The subroutine CALL JUNJO shown by numeral 140 in FIG. 20 is for determining the order in which delivery is made. This order may be the sequence determined by the processing in the block shown by numeral 320 in FIG. 19.

The subroutine CALL OUTPUT shown by numeral 130 in FIG. 20 is for allotting pallets and preparing output data for delivery schedule, and will not be explained here as it is not especially related to the present invention.

MINIM (N, DATA) and MAXIM (N, DATA) in the block 317 in FIG. 19 are functions for determining the suffix l associated with a minimum or maximum in the DATA (l) in the number of N.

Figure 17:
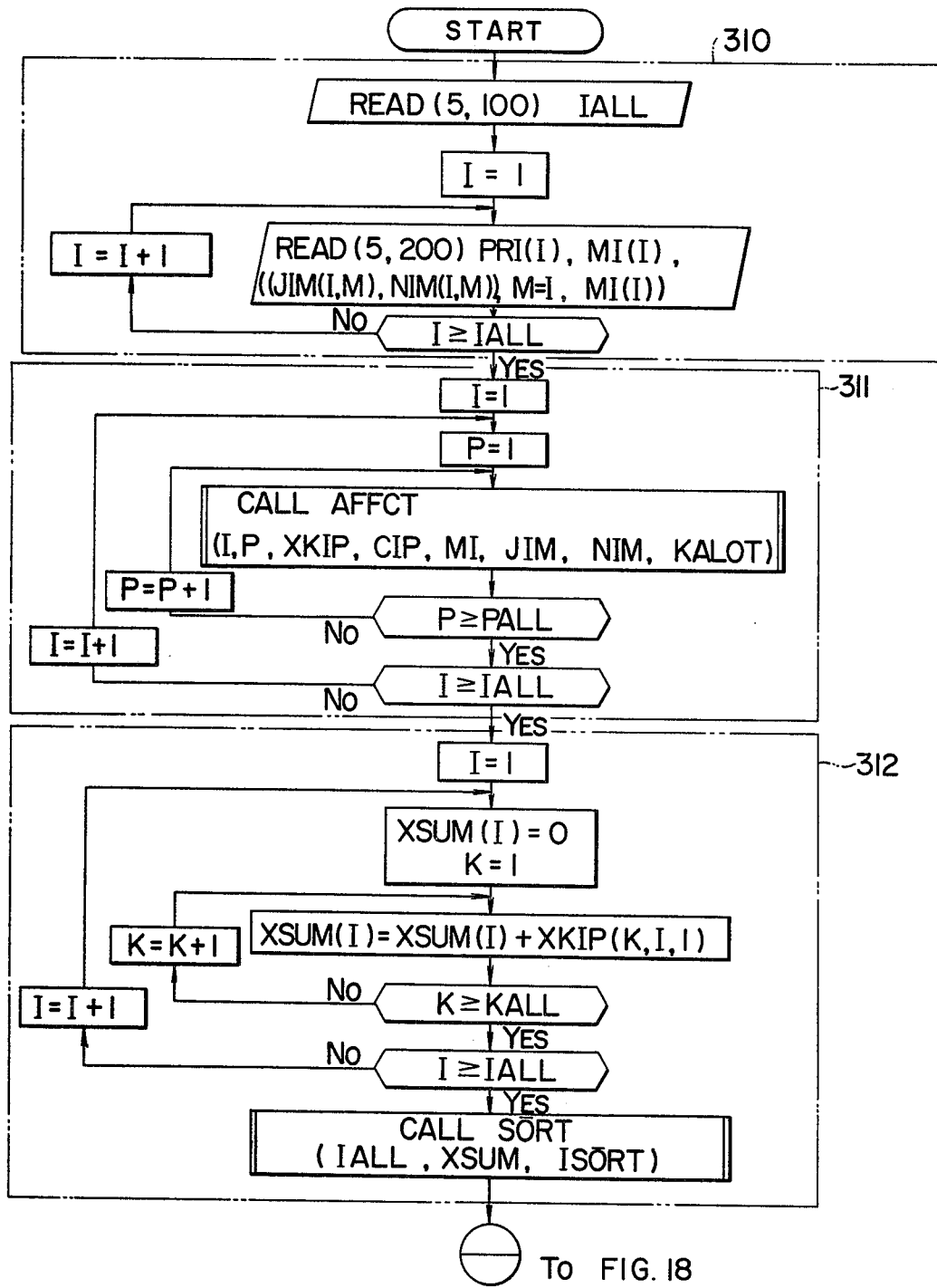
FIGS. 17, 18, 19 and 20 are flow charts showing the detail of the optimum delivery schedule-determining means illustrated in FIGS. 14 and 15.
Figure 18:
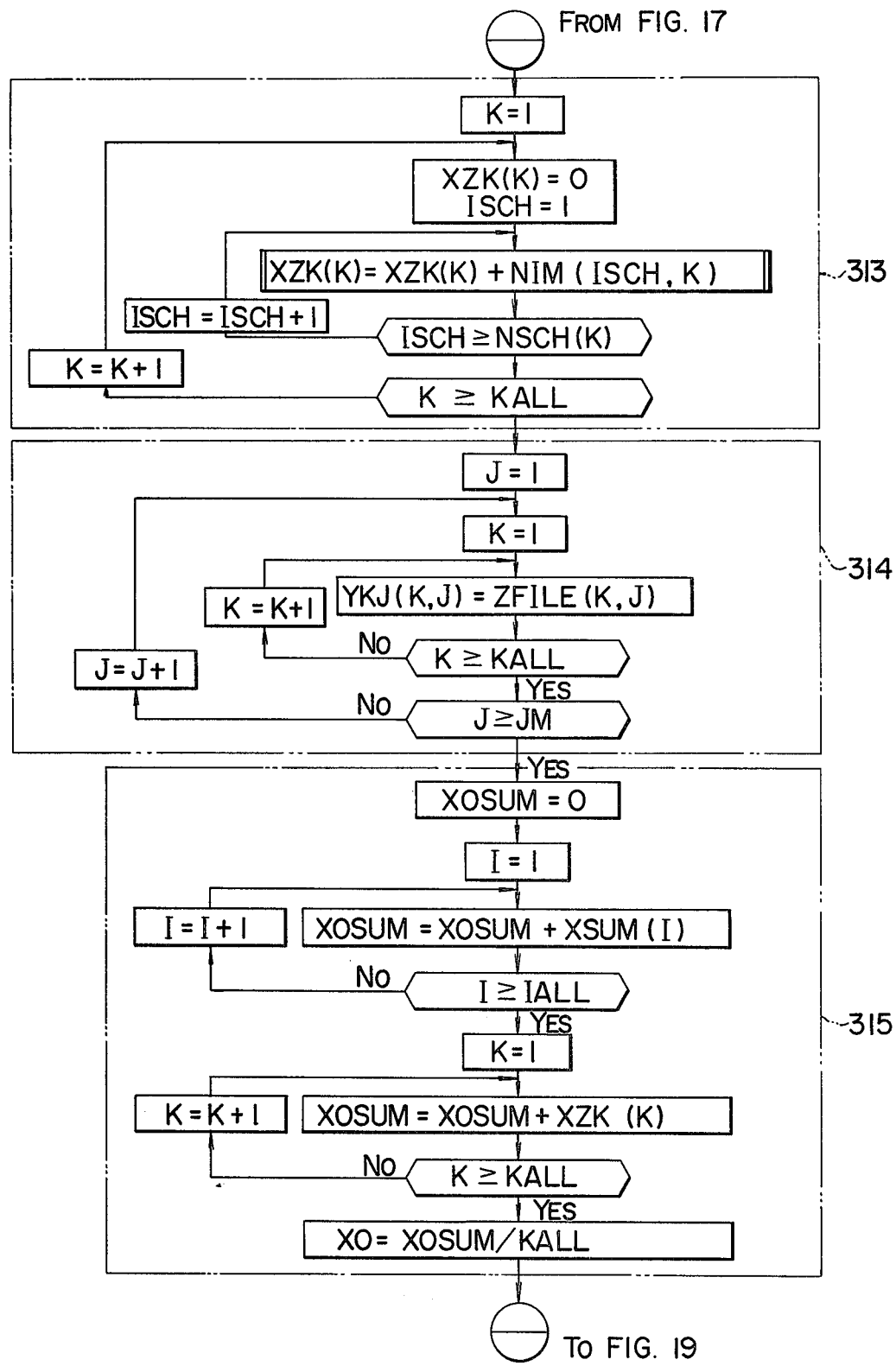
Figure 21:
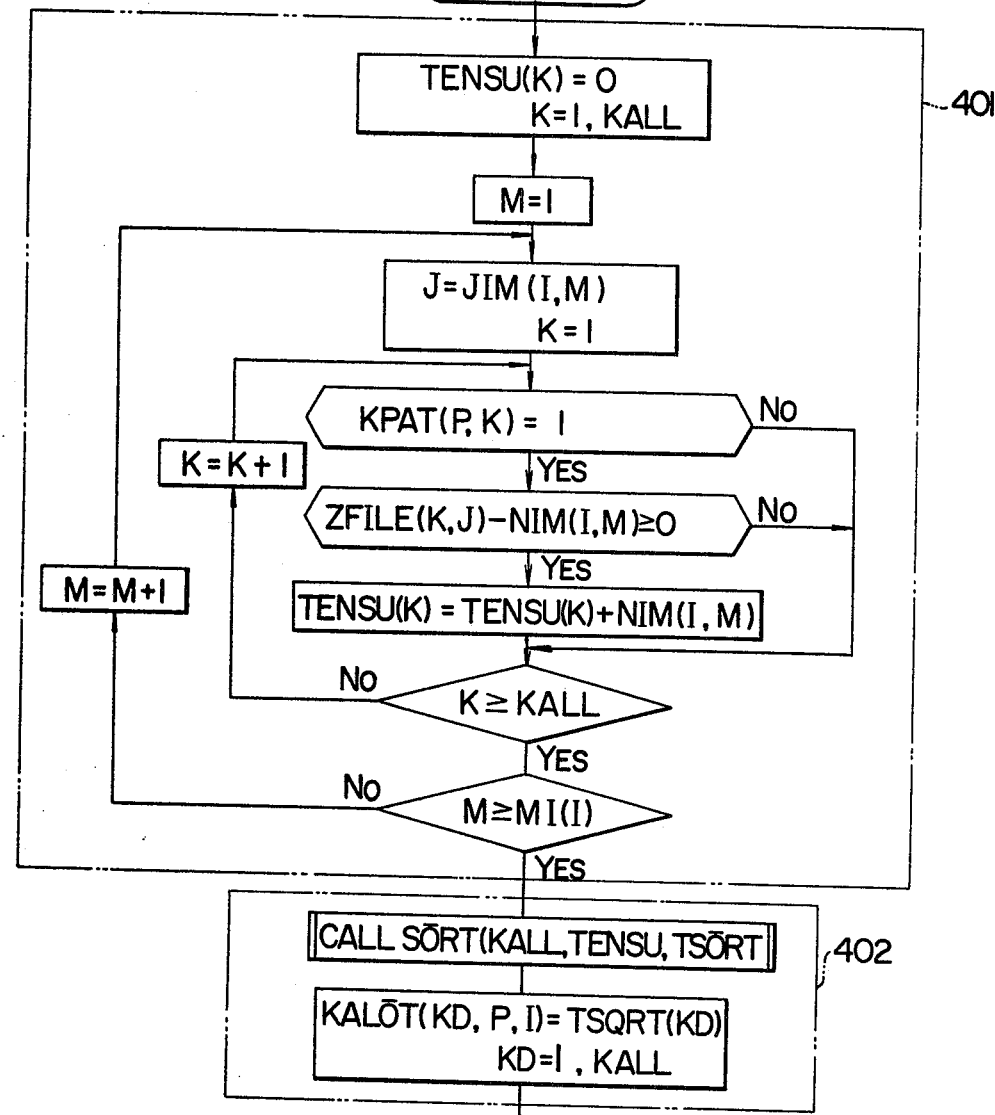
FIGS. 21 and 22 are flow charts showing the detail of the subroutine CALL AFFECT generally shown by reference numeral 311 in FIG. 17.
Figure 22:
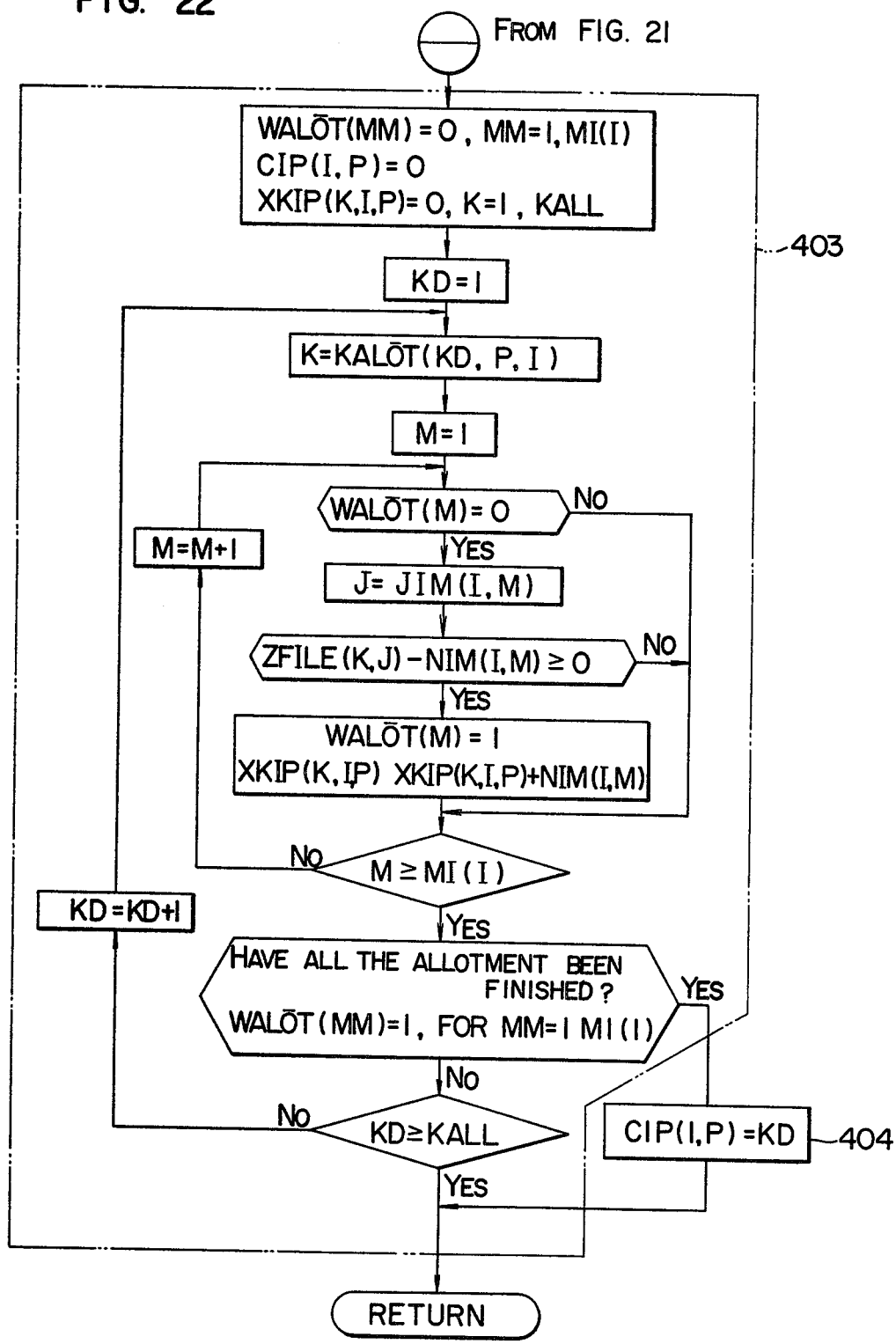

A detailed flow chart of the subroutine CALL AFFECT in the block denoted by numeral 311 in FIG. 17 is shown in FIGS. 21 and 22. The block 401 shows a subroutine for determining the total number of articles TENSU (K) deliverable from the storage block k in response to an order of customer i. The routine 402 is for arranging the storage blocks in the order of the decreasing amount of TENSU (K) and for setting them in KALOT (KD, P, I), where P and I show a designated storage block group and customer respectively. The routine shown by numeral 403 is provided for attempting the delivery allotment to the storage blocks for determining a related work balance affecting-factor XKIP (K,I,P). In the routine block 404, the concentration work amount-affecting factor $C_{i,p}$ associated with the above-mentioned delivery allotment is obtained.

In spite of the fact that according to the above-mentioned embodiments of the present invention the storage blocks are divided into the three groups including odd-numbered storage blocks, even-numbered storage blocks as well as the whole warehouse, they may be divided into a plurality of groups in a desired number, in which case the whole warehouse may not necessarily be a set of the sums of the groups only if all items are capable of being delivered from each group. From the above description of the embodiments, however, it is apparent that it is more advantageous if the storage blocks are fewer in number from the viewpoint of time and memory capacity required for calculations.

Furthermore, the three groups mentioned above may alternatively be the two groups of FIGS. 11b and 11c, thus reducing both the memory capacity and calculation time. It should be noted, however, that the reduction in the number of groups reduces the freedom of formulation of the delivery schedule, with the result that the interblock work balance for, say, each day is not necessarily achieved.

Although no description has been made of the priority given to an urgent delivery by interruption, such an interruption is possible in the sequence memory 130. Further, if the amount of the urgent delivery is small enough, it is easy to effect such a delivery without affecting the predetermined delivery schedule.

In addition, the on-line management of stock amount employed in the embodiments mentioned above may be replaced by postfact processing. This lessens the required calculation time and memory capacity, but makes it difficult to know the stock amount at a given time, thus making it impossible to decide on whether or not a requisition for urgent delivery should be met.

We claim:

1. A method of storing articles in a warehouse that comprises a plurality of storage blocks arranged adjacent each other, each of the storing blocks having a plurality of spaced racks for storing articles, linearly extending aisles between said racks, article transfer means arranged for movement in respective aisles to transfer articles relative to a given location within a respective storage block, control means for operating said article transfer means in accordance with a predetermined mode to transfer articles relative to said storage blocks, comprising the steps of:
   storing a plurality of different articles in said storage blocks with at least two different articles in each storage block;
   storing in a first storage block at least one and another different articles;
   storing in a second storage block at least one article common to the one different article in said first storage block and at least one additional different article;
   storing in a third and any succeeding storage block at least one article common to said at least one additional different article of the immediately preceding storage block and at least one further different article; and
   storing in the last storage block as said at least one further different article an article common to said another different article of said first storage block to form an imaginary loop of articles in said warehouse.

2. The method according to claim 1, further comprising the step of controlling by said control means the sequential entry and delivery of the plurality of articles by said article transfer means to and from said storage blocks in accordance with the predetermined mode.

3. The method according to claim 1, further comprising the step of storing in each of at least two storage block groups formed out of said plurality of storage blocks at least said plurality of different articles.

4. The method according to claim 3, wherein the step of storing in each of at least two storage block groups includes storing said plurality of articles in said plurality of storage blocks as one of the at least two storage block groups.

5. The method according to claim 3, wherein said control means includes a memory means for storing information of said at least two storage block groups, said plurality of storage blocks and said plurality of articles stored in the warehouse in accordance with the predetermined mode and wherein articles are delivered from the warehouse in response to an order from a customer comprising the steps of:
   setting and storing a plurality of delivery command signals corresponding to the one customer order in said memory means; and
   selecting a storage block group for responding to all of the delivery command signals for the one customer order in accordance with said delivery command signals and said stored information in the memory means.

6. The method according to claim 5, further comprising the steps of:
   determining a delivery sequence schedule for the selected storage block group;
   storing the delivery sequence schedule in the memory means; and
   transmitting a delivery command signal to said article transfer means in accordance with the delivery sequence schedule for delivering the articles requested by the one customer order.

7. The method according to claim 6, further comprising the step of automatically updating the stock amount of the warehouse in accordance with the storage and delivery conditions and storing the updated stock amount in the memory means.

8. The method according to claim 6, wherein the step of selecting a storage block group includes the steps of:
   determining the affected work amount for each storage block group for filling the one customer order and generating a signal in accordance therewith;
   determining the affected concentration work amount for each storage block group for filling the one customer order and generating a signal in accordance therewith;
   determining the balance of delivery work amount for article transfer means associated with respective storage blocks in the warehouse and generating a signal in accordance therewith; and
   selecting a storage block group from the at least two storage block groups in response to the signal of affected work amount, affected concentration work amount and balance of delivery work amount so as to optimize the utilization of the warehouse and article transfer means for filling each customer order.

* * * * *